(12) United States Patent
Sato et al.

(10) Patent No.: US 7,123,026 B2
(45) Date of Patent: Oct. 17, 2006

(54) SURFACE SHAPE RECOGNITION SENSOR AND METHOD OF MANUFACTURING THE SAME

(75) Inventors: Norio Sato, Kanagawa (JP); Katsuyuki Machida, Kanagawa (JP); Hakaru Kyuragi, Tokyo (JP); Satoshi Shigematsu, Kanagawa (JP); Hiroki Morimura, Kanagawa (JP); Hiromu Ishii, Kanagawa (JP); Toshishige Shimamura, Kanagawa (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 358 days.

(21) Appl. No.: 10/052,640

(22) Filed: Jan. 18, 2002

(65) Prior Publication Data
US 2002/0121909 A1 Sep. 5, 2002

(30) Foreign Application Priority Data
Jan. 31, 2001 (JP) ............................ 2001-022852

(51) Int. Cl.
G01R 27/06 (2006.01)
G01R 27/08 (2006.01)

(52) U.S. Cl. ................. 324/658; 324/686; 324/692
(58) Field of Classification Search .......... 324/658, 324/686, 692
See application file for complete search history.

(56) References Cited

U.S. PATENT DOCUMENTS 6,060,756 A * 5/2000 Machida et al. ........... 257/415
6,494,096 B1 * 12/2002 Sakai et al. ............. 73/514.32

FOREIGN PATENT DOCUMENTS

| JP | 11-248 10 | 9/1999 |
| JP | 11-248410 | 9/1999 |
| JP | 2000-199701 | 7/2000 |

* cited by examiner

Primary Examiner—Anjan Deb
Assistant Examiner—John Teresinski
(74) Attorney, Agent, or Firm—Blakely Taylor & Zaffman

(57) ABSTRACT

A surface shape recognition sensor includes capacitive detection elements, support electrode, protective film, and projections. The detection elements are formed from lower electrodes and a deformable plate-like upper electrode made of a metal. The lower electrodes are insulated and isolated from each other and stationarily laid out on a single plane of an interlevel dielectric formed on a semiconductor substrate. The upper electrode is laid out above the lower electrodes at a predetermined interval and has opening portions. The support electrode is laid out around the lower electrodes while being insulated and isolated from the lower electrodes, and formed to be higher than the lower electrodes to support the upper electrode. The protective film is formed on the upper electrode to close the opening portions. The projections per one pixel are laid out in a region of the protective film above the capacitive detection element.

10 Claims, 20 Drawing Sheets

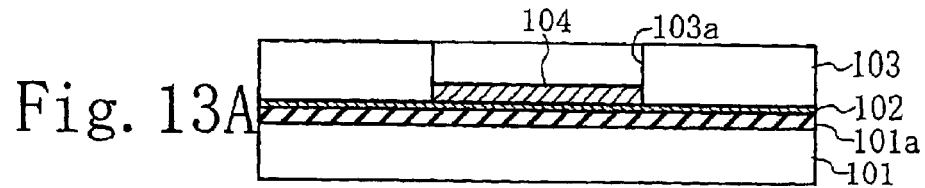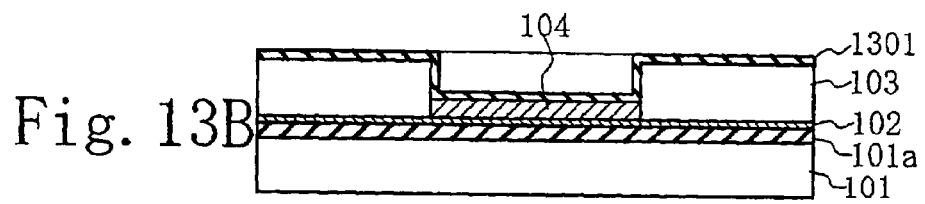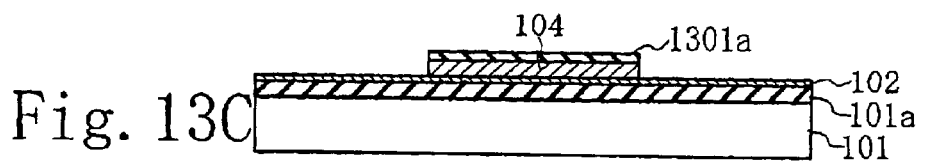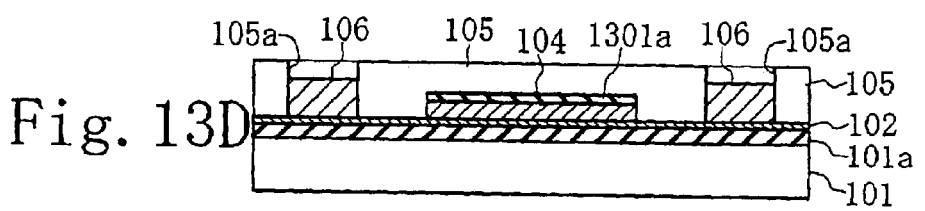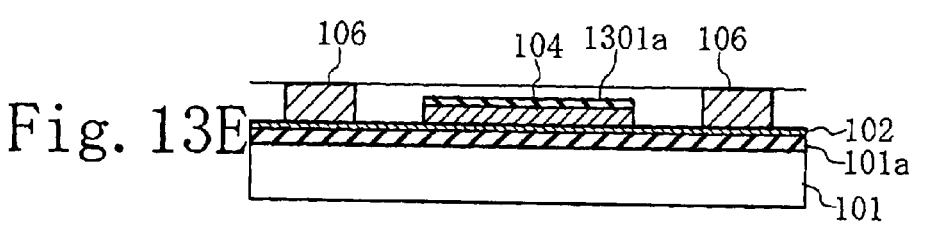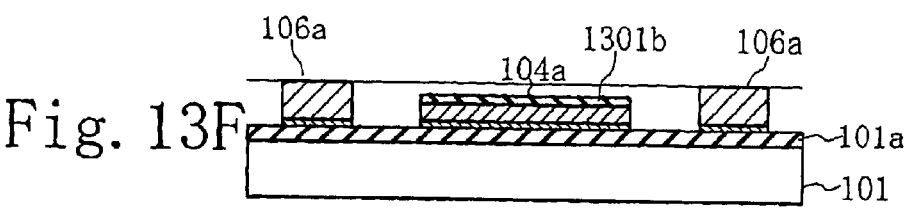

$d-t = \text{constant}, \quad t_1 < t_2 < t_3, \quad d_1 < d_2 < d_3$ t=constant, $d_1 < d_2 < d_3$ Elastic deformation range of Upper electrode $0 < x < d_2 - t$ $d = d_1$ $d = d_2$ $d = d_3$ t=constant, d=constant  $\varepsilon_3 < \varepsilon_2 < \varepsilon_1$
$\varepsilon = \varepsilon_1$ 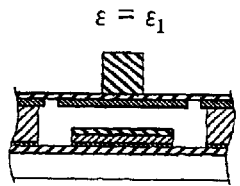  $\varepsilon = \varepsilon_2$ 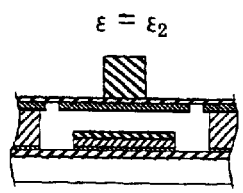  $\varepsilon = \varepsilon_3$ 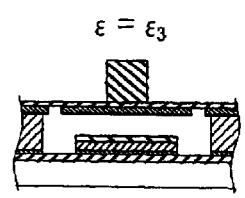
Fig. 19A   Fig. 19B   Fig. 19C
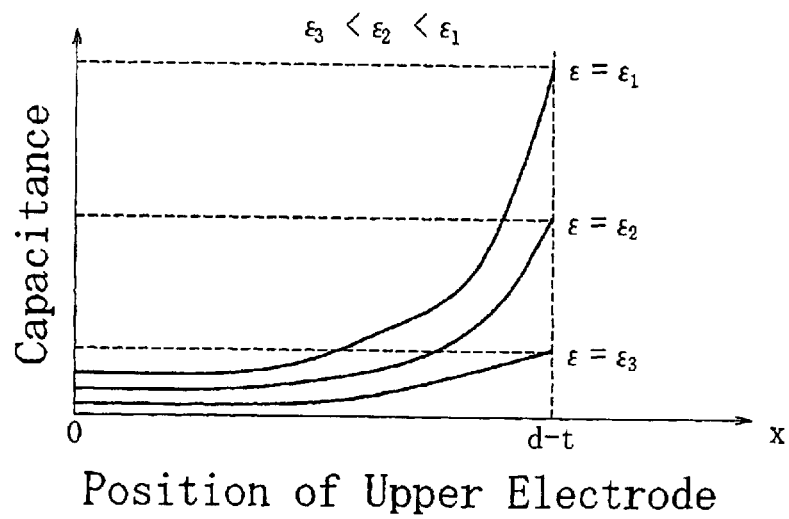
Position of Upper Electrode
Fig. 19D

SURFACE SHAPE RECOGNITION SENSOR AND METHOD OF MANUFACTURING THE SAME

BACKGROUND OF THE INVENTION

The present invention relates to a surface shape recognition sensor used to sense a surface shape having a fine three-dimensional pattern such as a human fingerprint or animal noseprint.

Along with the progress in information-oriented society in the environment of the current society, the security technology has received a great deal of attention. For example, in the information-oriented society, a personal authentication technology for establishment of, e.g., an electronic cash system is an important key. Authentication technologies for preventing theft or illicit use of credit cards have also been extensively researched and developed (e.g., Yoshimasa Shimizu et al., "A Study on the Structure of a Smart Card with the Function to Verify the Holder", Technical Report of IEICE OFS92-32, pp. 25–30 (1992-11)).

There are various kinds of authentication schemes such as fingerprint authentication and voice authentication. Especially, many fingerprint authentication techniques have been developed so far. Fingerprint authentication schemes are roughly classified into an optical reading scheme and a scheme of using the human electric characteristic and detecting the three-dimensional pattern of the skin surface of a finger and replacing it with an electrical signal.

In the optical reading scheme, fingerprint data is read mainly using reflection of light and an image sensor (CCD) and collated (e.g., Seigo Igaki et al., Japanese Patent Laid-Open No. 61-221883). A scheme of reading a pressure difference by the three-dimensional pattern of the skin surface of a finger using a piezoelectric thin film has also been developed (e.g., Masanori Sumihara et al., Japanese Patent Laid-Open No. 5-61965).

An authentication scheme of replacing a change in electric characteristic due to contact of a skin with an electrical signal distribution by detecting a resistive or capacitive change amount using a pressure sensitive sheet so as to detect a fingerprint has also been proposed (e.g., Kazuhiro Itsumi et al., Japanese Patent Laid-Open No. 7-168930).

In the above prior arts, however, the optical reading scheme is difficult to make a compact and versatile system, and its application purpose is limited. The scheme of detecting the three-dimensional pattern of the skin surface of a finger using a pressure sensitive sheet or the like is difficult to put into practical use or is unreliable because a special material is required and fabrication is difficult.

"Marco Tartagni" et al. have developed a capacitive fingerprint sensor using an LSI manufacturing technology (Marco Tartagni and Robert Guerrieri, A 390 dpi Live Fingerprint Imager Based on Feedback Capacitive Sensing Scheme, 1997 IEEE International Solid-State Circuits Conference, pp. 200–201 (1997)).

In this fingerprint sensor, the three-dimensional pattern of a skin is detected using a feedback static capacitance scheme by a sensor chip in which small capacitive detection sensors are two-dimensionally arrayed.

In the capacitive detection sensor, two plates are formed on the uppermost layer of an LSI, and a passivation film is formed on the plates. In this capacitive detection sensor, a skin surface functioning as a third plate is isolated by an insulating layer formed from air, and sensing is performed using the difference in distance, thereby detecting a fingerprint. As characteristic features of a fingerprint authentication system using this structure, no special interface is necessary, and a compact system can be constructed, unlike the conventional optical scheme.

In principle, a fingerprint sensor using a capacitive detection sensor is obtained by forming a lower electrode on a semiconductor substrate and forming a passivation film on the resultant structure. A capacitance by the skin and lower electrode is detected through the passivation film, thereby detecting the fine three-dimensional pattern of the skin surface of a finger. As shown in FIG. 21, a capacitive detection sensor is formed from a lower electrode 2102 formed on a semiconductor substrate 2101 via an interlevel dielectric 2101*a*, and a passivation film 2103 that covers the resultant structure.

A fingerprint sensor chip is formed by arraying a plurality of capacitive detection sensors on the semiconductor substrate 2101 in a matrix. Although not illustrated in FIG. 21, an integrated circuit having, e.g., a plurality of MOS transistors and interconnection structure is formed on the semiconductor substrate 2101 under the interlevel dielectric 2101*a*. The lower electrodes 2102 are connected to the integrated circuit by interconnections (not shown). A capacitance generated in the plurality of lower electrodes 2102 is detected by a detection circuit formed on the integrated circuit and output.

In this sensor chip, when a finger whose fingerprint is to be detected comes into contact with the passivation film 2103, the skin in contact with the passivation film 2103 functions as an electrode on each lower electrode 2102, and a capacitance is formed between the skin surface and the lower electrode 2102. The formed capacitance is detected by the detection circuit through the interconnection (not shown) connected to the lower electrode 2102.

A fingerprint is formed by the three-dimensional pattern of a skin. Hence, the distance between each lower electrode 2102 and a skin serving as an electrode in contact with the passivation film 2103 changes between the projection and recess of the fingerprint. The difference in distance is detected as a difference in capacitance. When the distribution of different capacitances from the respective lower electrode 2102 is detected, a fingerprint pattern can be obtained. As described above, a sensor chip using capacitive detection sensors serves as a surface shape recognition sensor capable of sensing a fine three-dimensional pattern of a skin.

In the above-described sensor chip using capacitive detection sensors, however, since a skin serves as an electrode, static electricity generated at the fingertip readily causes electrostatic destruction in an integrated circuit such as a sensor circuit incorporated in the sensor chip.

To prevent the above-described electrostatic destruction of an electrostatic capacitance fingerprint sensor, a surface shape recognition sensor having an electrostatic capacitive detection sensor having a sectional structure as shown in FIG. 22 has been proposed. The sensor shown in FIG. 22 will be described. The sensor has a lower electrode 2203 formed on a semiconductor substrate 2201 via an interlevel dielectric 2202, a plate-shaped deformable upper electrode 2204 which is separated from the lower electrode 2203 at a predetermined interval, and a support electrode 2205 laid out around the lower electrode 2203 to support the upper electrode 2204 while being insulated and isolated from the lower electrode 2203.

In the sensor having the above arrangement, when a finger to be subjected to fingerprint detection comes into contact with the upper electrode 2204, the pressure from the finger deflects the upper electrode 2204 toward the lower electrode 2203 to change the electrostatic capacitance formed between the lower electrode 2203 and the upper electrode 2204. This change in electrostatic capacitance is detected by a detection circuit (not shown) on the semiconductor substrate 2201 through an interconnection (not shown) connected to the lower electrode 2203. In this surface shape recognition sensor, when the upper electrode 2204 is grounded through the conductive support electrode 2205, static electricity generated at the fingertip and discharged to the upper electrode 2204 flows to ground through the support electrode 2205. For this reason, the detection circuit incorporated under the lower electrode 2203 is protected from electrostatic destruction.

However, the above-described conventional fingerprint sensors can obtain no desired high sensitivity. For example, in the fingerprint sensor having the structure shown in FIG. 21, since the sensitivity largely changes depending on the state of a finger surface, it is difficult to obtain a high sensitivity. In the fingerprint sensor having the structure shown in FIG. 22, since no large change in upper electrode is obtained, no high sensitivity can be obtained.

SUMMARY OF THE INVENTION

The present invention has been made to solve the above problems, and has as its object to provide a surface shape recognition sensor capable of detecting a shape such as a fingerprint at a higher sensitivity.

In order to achieve the above object, according to the present invention, there is provided a surface shape recognition sensor comprising a plurality of capacitive detection elements formed from lower electrodes and a deformable plate-like upper electrode made of a metal, the lower electrodes being insulated and isolated from each other and stationarily laid out on a single plane of an interlevel dielectric formed on a semiconductor substrate, and the upper electrode being laid out above the lower electrodes at a predetermined interval and having a plurality of opening portions, a support electrode laid out around the lower electrodes while being insulated and isolated from the lower electrodes, and formed to be higher than the lower electrodes to support the upper electrode, a protective film formed on the upper electrode to close the opening portions, and a plurality of projections laid out in a region of the protective film above the capacitive detection element.

BRIEF DESCRIPTION OF THE DRAWINGS

FIGS. 13A to 13F are schematic sectional views showing steps in manufacturing a surface shape recognition sensor according to still another embodiment of the present invention;

FIGS. 19A to 19C are schematic sectional views for explaining the operative states of a surface shape recognition sensor according to still another embodiment of the present invention;

FIG. 19D is a graph showing the characteristic of the surface shape recognition sensor according to the embodiment of the present invention;

DESCRIPTION OF THE PREFERRED EMBODIMENTS

The embodiments of the present invention will be described below with reference to the accompanying drawings.

<First Embodiment>

Figure 1A:
FIGS. 1A to 1G are schematic views showing steps in manufacturing a surface shape recognition sensor according to an embodiment of the present invention.

FIGS. 1A to 3C explain a method of manufacturing a surface shape recognition sensor according to an embodiment of the present invention. The manufacturing method will be described below with reference to FIGS. 1A to 3C. First, as shown in FIG. 1A, an interlevel dielectric 101a is formed on a substrate 101 made of a semiconductor material such as silicon. Another integrated circuit such as a detection circuit (not shown) having an interconnection structure with a plurality of interconnections is formed on the substrate 101 under the interlevel dielectric 101a.

After formation of the interlevel dielectric 101a, a seed layer (first metal film) 102 having a two-layered structure including a 0.1-µm thick titanium film and a 0.1-µm thick gold film is formed by vapor deposition or the like.

Figure 1B:
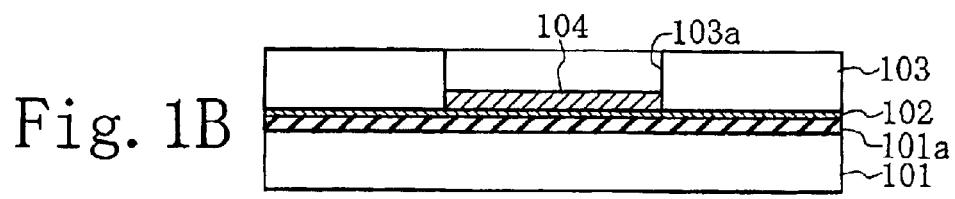

Next, as shown in FIG. 1B, a 5-µm thick resist pattern (first mask pattern) 103 having an opening portion 103a is formed on the seed layer 102. The resist pattern 103 is formed by known photolithography. After the resist pattern 103 is formed, a 1-µm thick metal pattern (first metal pattern) 104 formed from a gold plating film is formed on the seed layer 102 exposed to the opening portion 103a by electroplating.

Figure 1C:
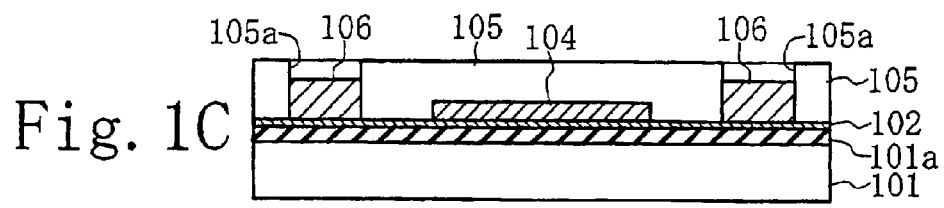

After the resist pattern 103 is removed, a 5-µm thick resist pattern (second mask pattern) 105 having an opening portion 105a is newly formed, as shown in FIG. 1C. At this time, the metal pattern 104 is covered with the resist pattern 105. After the resist pattern 105 is formed, a 3-µm thick metal pattern (second metal pattern) 106 formed from a gold plating film is formed on the seed layer 102 exposed to the opening portion 105a by electroplating.

After the resist pattern 105 is removed, the seed layer 102 is selectively etched using the metal patterns 104 and 106 as a mask. In this etching, first, the upper layer of the seed layer 102, i.e., the gold film is selectively removed using an etchant containing iodine, ammonium iodide, water, and ethanol. Next, the lower layer of the seed layer 102, i.e., the titanium film is selectively removed using an HF-based etchant. In wet etching of gold, the etching rate is 0.05 µm/min.

Figure 1D:
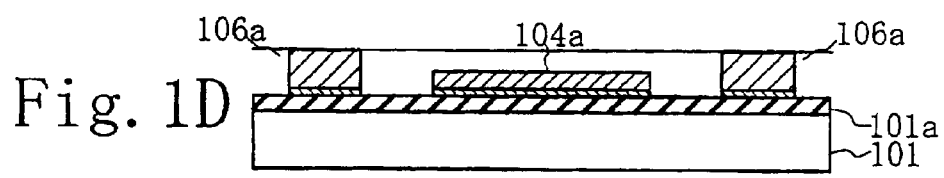

As a result, as shown in FIG. 1D, a lower electrode 104a with an upper layer formed from gold and a support electrode 106a insulated and isolated from the lower electrode 104a are formed on the substrate 101. The support electrode 106a supports an upper electrode (to be described later) and is formed in, e.g., a lattice shape on the substrate 101, as shown in the plan view of FIG. 1G. A plurality of lower electrodes 104a are respectively laid out in the central portions of regions surrounded by the lattice-shaped support electrode 106a.

One lower electrode 104a and a region surrounded by the lattice-shaped support electrode 106a, where the lower electrode 104a is laid out, form one sensor cell (capacitive detection element). The shape of the support electrode 106a is not limited to the lattice shape. For example, a plurality of support electrodes each having a rectangular columnar shape with a square bottom surface may be laid out around each lower electrode 104a (e.g., on lines extended from four corners).

Figure 1E:
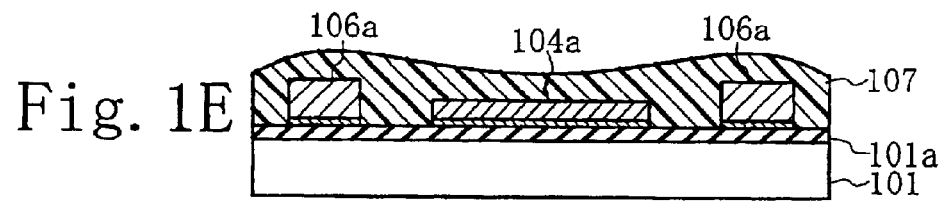

As shown in FIG. 1E, a photosensitive resin film 107 is formed on the substrate 101 by spin coating to cover the lower electrode 104a and support electrode 106a. The resin film 107 has a positive photosensitivity. The resin film 107 is prepared by, e.g., adding a positive photosensitive material to a base resin such as polyamide, polyamide acid, or polybenzoxazole (or a precursor thereof).

The resultant resin film 107 is heated (prebaked) by keeping the substrate 101 placed on a hot plate heated to about 120° C. for about 4 min.

Figure 1F:
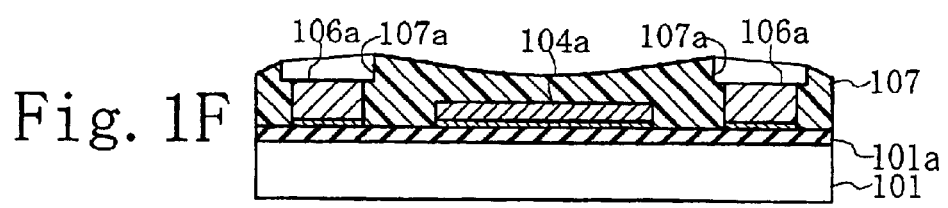
Figure 1G:
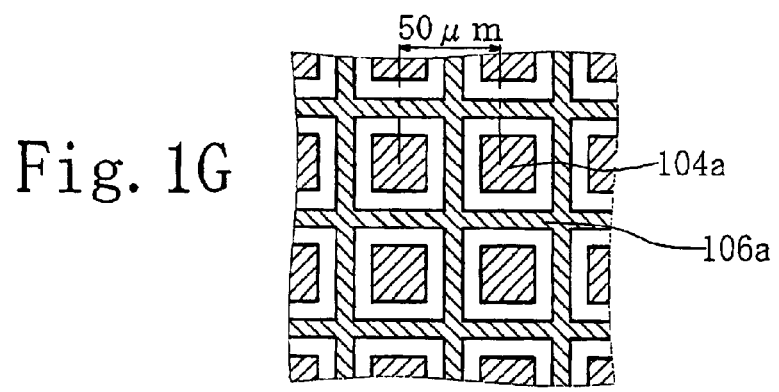

Next, the region on the support electrode 106a is exposed by known photolithography. Subsequently, development processing is executed, thereby forming, in the resin film 107, an opening portion 107a to which the upper portion of the support electrode 106a is exposed, as shown in FIG. 1F. After development processing, the resin film 107 is heated to about 310° C. and thermally cured.

Figure 2A:
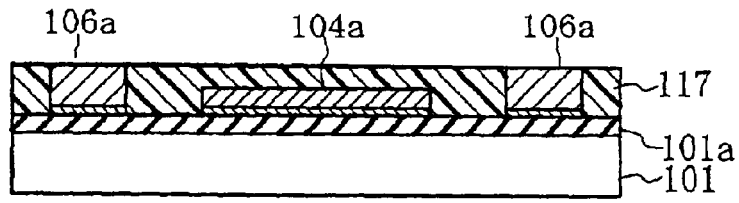
FIGS. 2A to 2E are schematic sectional views showing steps in manufacturing the surface shape recognition sensor according to the embodiment of the present invention.

The cured resin film 107 is etched back by chemical mechanical polishing to form a sacrificial film 117 having a flat surface, as shown in FIG. 2A. At this time, the upper surface of the support electrode 106a is almost flush with the surface of the sacrificial film 117. The upper surface of the support electrode 106a is exposed.

Figure 2B:
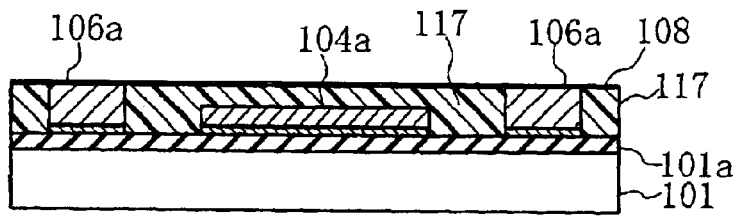

As shown in FIG. 2B, a seed layer 108 having a two-layered structure including a 0.1-µm thick titanium film and a 0.1-µm thick gold film is formed by vapor deposition or the like on the sacrificial film 117 which is flattened to expose the upper surface of the support electrode 106a.

Figure 2C:
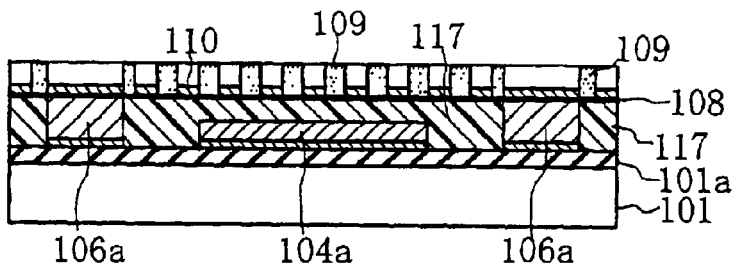

As shown in FIG. 2C, a resist pattern 109 having a mesh-like opening region is formed. A 0.4-µm thick metal film 110 formed from a gold plating film is formed on the seed layer 108 exposed to the region without the resist pattern 109 by electroplating. The metal film 110 has a mesh-like shape.

After the resist pattern 109 is removed, the seed layer 108 is selectively etched and removed using the formed metal film 110 as a mask. In this etching, first, the upper layer of the seed layer 108, i.e., the gold film is selectively removed using an etchant containing iodine, ammonium iodide, water, and ethanol. Next, the lower layer of the seed layer 108, i.e., the titanium film is selectively removed using an HF-based etchant. In wet etching of gold, the etching rate is 0.05 µm/min.

Figure 2D:
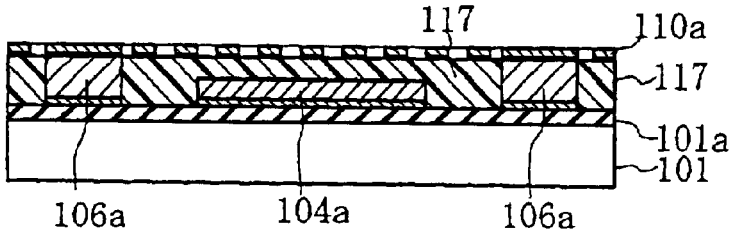

As a result, as shown in FIG. 2D, a mesh-like upper electrode 110a having a plurality of opening portions is formed. The upper electrode 110a is integrally formed over a plurality of sensor cells.

Figure 2E:
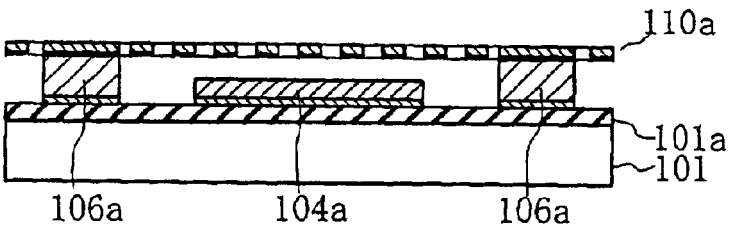

The substrate 101 with the completed upper electrode 110a is exposed to a plasma mainly containing oxygen gas. An etching species generated by the plasma is brought into contact with the sacrificial film 117 through the opening portion of the upper electrode 110a to remove the sacrificial film 117. Consequently, as shown in FIG. 2E, a space is formed under the upper electrode 110a which is supported by the support electrode 106a. A structure in which the upper electrode 110a and lower electrode 104a are separated by the space is formed.

Figure 3A:
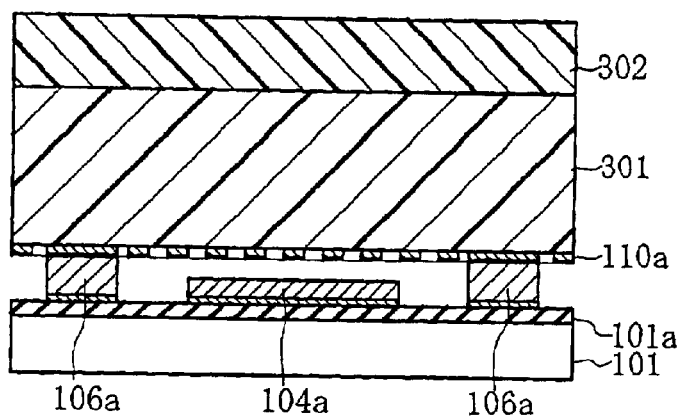
FIGS. 3A to 3C are schematic sectional views showing steps in manufacturing the surface shape recognition sensor according to the embodiment of the present invention.

As shown in FIG. 3A, a surface of a sheet film 302, on which a photosensitive resin film 301 (thickness: 10 µm) made of polyimide having photosensitivity is formed, is bonded to the upper surface of the upper electrode 110a. The photosensitive resin film 301 is formed on the sheet film 302 in advance by, e.g., spin coating. In order to bond the sheet film 302 to the upper electrode 110a, the substrate 101 is placed in a container that is evacuated to a predetermined degree of vacuum. A load is applied between the substrate 101 and the sheet film 302, and the photosensitive resin film 301 is heated through the sheet film 302, thereby bonding the photosensitive resin film 301 to the upper electrode 110a.

Figure 3B:
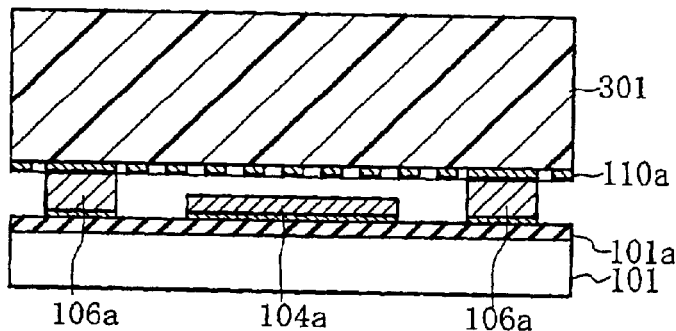

The degree of vacuum is 1 Torr. The load is 5 kg. The heating temperature is 150° C. The load and heat are applied for about 1 min. After that, the sheet film 302 is removed from the photosensitive resin film 301 bonded to the upper electrode 110a to form (transfer) the 10-µm thick photosensitive resin film 301 on the upper electrode 110a, as shown in FIG. 3B. The above-described method of forming the photosensitive resin film 301 by bonding is called STP (Spin coating film Transfer and hot Pressing). To form the photosensitive resin film 301 on the sheet film 302, another method other than spin coating may be used.

Next, a predetermined pattern is exposed to the photosensitive resin film 301 formed on the upper electrode 110a and developed to form a pattern. The pattern is thermally cured at 300° C. for 30 min to form a protective film 311 which has a plurality of projection portions (projections) 311a in a region above the lower electrode 104a and covers the upper electrode 110a. When the exposure amount or developing amount (time) is adjusted, the projection portions 311a can be formed while keeping the protective film 311 remaining at the lower portion.

Figure 3C:
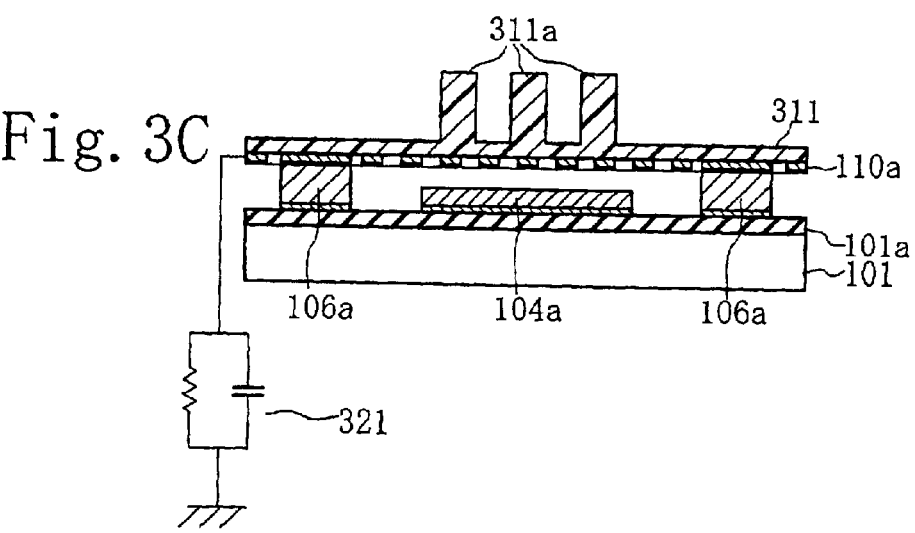

In the surface shape recognition sensor formed in the above-described way, whose portion (one sensor cell) is shown in FIG. 3C, when a fingertip portion comes into contact with the projection portions 311a, the projection portions 311a are pressed downward in accordance with the skin surface shape of the finger in contact to deform the upper electrode 110a. Hence, the capacitance formed between the upper electrode 110a and the lower electrode 104a changes. When halftone data is obtained in correspondence with the change in capacitance formed on each lower electrode 104a (sensor cell) according to the skin surface shape, the skin surface shape can be reproduced.

In this embodiment, one sensor cell has a plurality of projection portions 311a. As compared to a structure with, e.g., one projection portion on one sensor cell, the upper electrode 110a on one sensor cell changes at a higher probability when an object comes into contact. Hence, the sensitivity can be improved.

Capacitive detection in each sensor cell when the upper electrode 110a deforms or conversion into halftone data is done by, e.g., an integrated circuit (not shown) formed on the substrate 101. For example, when the upper electrode 110a is grounded through a protection circuit 321 or the like, as shown in FIG. 3C, even when static electricity generated in an object is discharged to the upper electrode 110a, the static electricity flows to ground through the protection circuit 321. When the upper electrode 110a is connected to ground, the integrated circuit can be prevented from electrostatic destruction.

<Second Embodiment>

Another embodiment of the present invention will be described next.

In the above embodiment, the resin film transferred onto the upper electrode 110a is processed to simultaneously form the protective film 311 and the plurality of projection portions 311a. However, these components may be individually formed, as will be described below.

As shown in FIGS. 1A to 2E, a lower electrode 104a, support electrode 106a, and mesh-like upper electrode 110a supported by the support electrode 106a are formed on a substrate 101 (interlevel dielectric 101a).

Figure 4A:
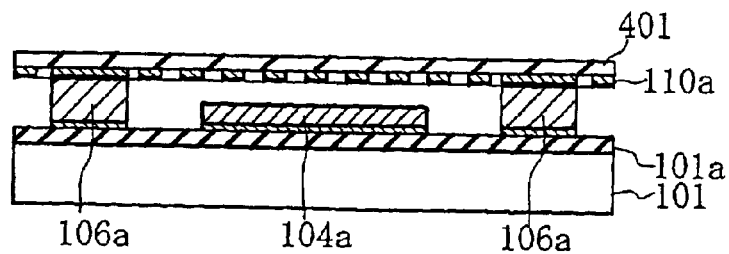
FIGS. 4A to 4C are schematic sectional views showing steps in manufacturing a surface shape recognition sensor according to another embodiment of the present invention.

As shown in FIG. 4A, a polyimide resin film is transferred onto the upper electrode 110a by the above-described STP method and thermally cured by a heat treatment at 300° C. for 30 min, thereby forming a 1-µm thick protective film 401 made of polyimide resin.

Figure 4B:
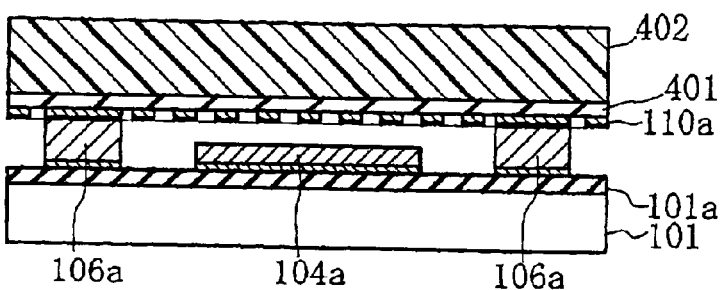

Photosensitive polyimide is applied to the protective film 401 to form a 5- to 10-µm thick photosensitive resin film 402, as shown in FIG. 4B. The resultant photosensitive resin film 402 is heated (prebaked) by keeping the substrate 101 placed on a hot plate heated to about 120° C. for about 4 min.

Figure 4C:
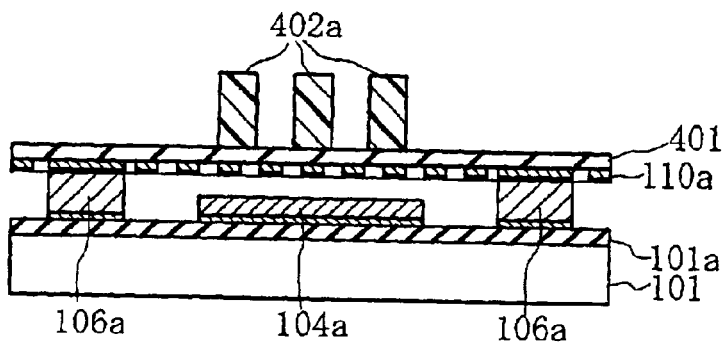

A region other than a region where projection portions are to be formed is exposed by known photolithography. Subsequently, development processing is executed to form projections 402a on the protective film 401, as shown in FIG. 4C. After development processing, the projections 402a are heated to about 300° C. and thermally cured.

In the above-described method, a protective film is formed on the upper electrode 110a by bonding transfer such as STP. However, the present invention is not limited to this. For example, any other method, such as CVD (Chemical Vapor Deposition) or coating, capable of forming a protective film on the upper electrode 110a while closing the plurality of opening portions of the upper electrode 110a can be used.

<Third Embodiment>

Still another embodiment of the present invention will be described next. In this embodiment, a projection of a metal is formed on an upper electrode. The manufacturing method will be described below.

As shown in FIGS. 1A to 2E, a lower electrode 104a, support electrode 106a, and mesh-like upper electrode 110a supported by the support electrode 106a are formed on a substrate 101 (interlevel dielectric 101a).

Figure 5A:
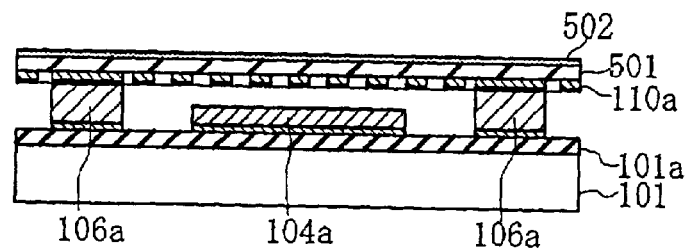
FIGS. 5A to 5C are schematic sectional views showing steps in manufacturing a surface shape recognition sensor according to still another embodiment of the present invention.

As shown in FIG. 5A, a 1-µm thick protective film 501 made of polyimide resin is formed on the upper electrode 110a by the above-described STP method. As transfer conditions, the degree of vacuum is 10 Torr. the load is 5 kg, and the heating temperature is 150° C. The load and heat are applied for about 1 min.

A seed layer (second metal film) 502 having a two-layered structure including a 0.1-µm thick titanium film and a 0.1-µm thick gold film is formed on the protective film 501 by vapor deposition or the like.

Figure 5B:
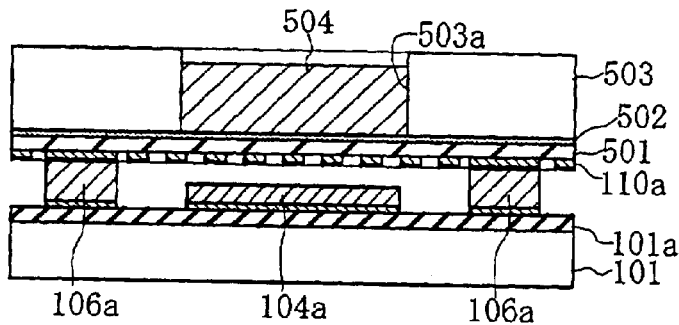

Next, as shown in FIG. 5B, a 30-µm thick resist pattern 503 having an opening portion (third mask pattern) 503a is formed on the seed layer 502. The resist pattern 503 is formed by known photolithography. After the resist pattern 503 is formed, a 20-µm thick metal pattern (third metal pattern) 504 formed from a gold plating film is formed on the seed layer 502 exposed to the opening portion 503a by electroplating.

After the resist pattern 503 is removed, the seed layer 502 is selectively etched using the metal pattern 504 as a mask. In this etching, first, the upper layer of the seed layer 502, i.e., the gold film is selectively removed using an etchant containing iodine, ammonium iodide, water, and ethanol. Next, the lower layer of the seed layer 502, i.e., the titanium film is selectively removed using an HF-based etchant. In wet etching of gold, the etching rate is 0.05 µm/min.

Figure 5C:
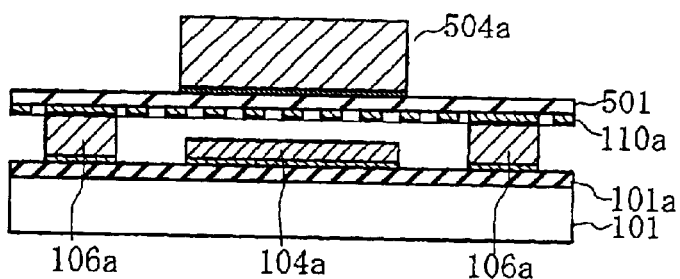

Consequently, a projection 504a having a gold upper layer is formed on the protective film 501, as shown in FIG. 5C. In this embodiment, since the projection 504a is made of a metal, a surface shape recognition sensor having a high mechanical strength can be formed, and the sensitivity can be improved. In addition, as compared to the above-described embodiments in which the projection is made of a resin, a higher projection can be formed. Even from this viewpoint, the sensitivity when an object comes into contact can be increased.

Figure 6A:
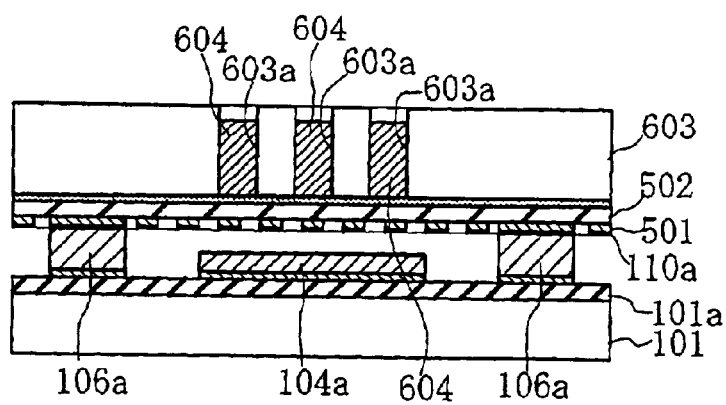
FIGS. 6A and 6B are schematic sectional views showing steps in manufacturing a surface shape recognition sensor according to still another embodiment of the present invention.

A plurality of projections made of a metal may be formed on one sensor cell. As shown in FIG. 6A, a 30-μm thick resist pattern 603 having a plurality of opening portions 603a is formed on the seed layer 502. A 20-μm thick metal pattern 604 formed from a gold plating film is formed on the seed layer 502 exposed to the plurality of opening portions 603a by electroplating.

Figure 6B:
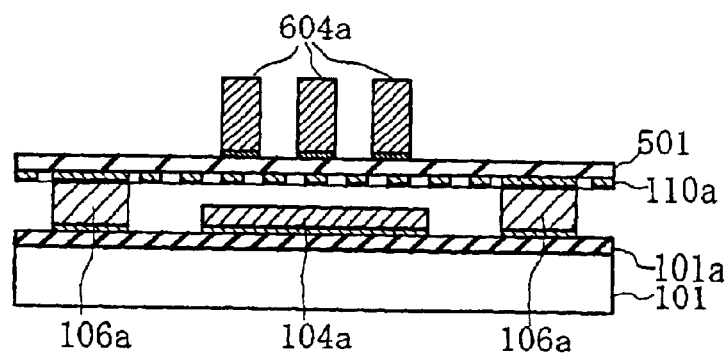

After the resist pattern 603 is removed, the seed layer 502 is selectively etched using the metal pattern 604 as a mask. As shown in FIG. 6B, a plurality of projections 604a each having a gold upper layer is formed on the protective film 501 in one sensor cell.

According to this embodiment, the projection is formed from a metal that has a high mechanical strength and is easy to process. For example, since a higher and thinner electrode structure can be formed, the amount of a change in upper electrode can be increased, and the probability of bringing the upper electrode into contact with an object to be measured can be increased.

<Fourth Embodiment>

In the above-described embodiments, as shown in FIGS. 2D and 2E, the resultant structure is exposed to a plasma mainly containing oxygen gas to remove the sacrificial film 117 through the opening portion of the upper electrode 110a. As the plasma mainly containing oxygen gas, the plasma of a gas mixture containing, e.g., $CF_4$ and oxygen gas is used.

In such dry etching, a polymer is newly produced due to the plasma of the gas mixture. Since the polymer sticks to the lower surface of the upper electrode 110a or to the upper surface of the lower electrode 104a, a residue due to etching remains in the formed space. Hence, no desired space can be realized.

Additionally, in the above dry etching, since the plasma of oxygen gas is used, the metal material of the upper electrode 110a or lower electrode 104a is oxidized to change its properties, resulting in, e.g., a decrease in conductivity. This poses a more serious problem when a thick sacrificial film is used to make a large space under the upper electrode because the time of processing by the oxygen plasma becomes long.

To prevent this, in the steps shown in FIGS. 2D and 2E, a sacrificial film 117 is removed in the following way. First, a substrate 101 with a completed upper electrode 110a is heated to, e.g., 250° C. to 300° C. in an ozone ambient to bring the ozone into contact with the sacrificial film 117 through a plurality of opening portions of the upper electrode 110a, thereby removing the sacrificial film 117. Consequently, as shown in FIG. 2E, a space is formed under the upper electrode 110a which is supported by a support electrode 106a. A fine structure in which the upper electrode 110a and lower electrode 104a are separated by the space is formed. Since the upper electrode 110a and lower electrode 104a are separated by the space, a substance having a very low dielectric constant, e.g., air is present between the upper electrode 110a and the lower electrode 104a. In addition, when the upper electrode 110a can deform, the upper electrode 110a can move.

As described above, according to this embodiment, since no plasma is used to remove the sacrificial film under the upper electrode 110a, damage to the upper electrode 110a can be suppressed. In addition, since the sacrificial film 117 made of a resin is ashed using ozone, no polymer is produced, unlike the case using a plasma, the sacrificial film 117 can be removed without forming any residue.

<Fifth Embodiment>

In the above-described embodiments, a resin film formed on a sheet film is bonded and transferred to form a protective film on an upper electrode. However, the present invention is not limited to this. A protective film may be formed by coating, as will be described below.

Figure 7A:
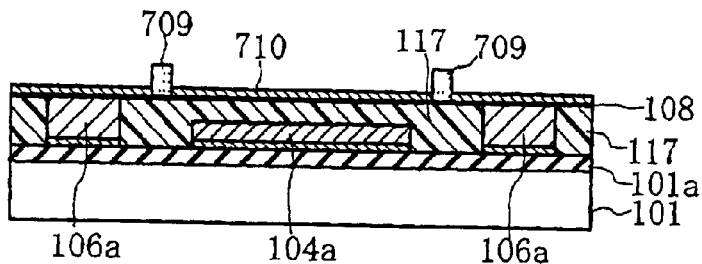
FIGS. 7A to 7D are schematic views showing steps in manufacturing a surface shape recognition sensor according to still another embodiment of the present invention.

First, as described with reference to FIG. 2B, a seed layer 108 is formed on a sacrificial film 117 with the exposed upper surface of a support electrode 106a. A columnar resist pattern 709 is formed on the seed layer 108. As shown in FIG. 7A, a 0.4-μm thick metal film 710 formed from a gold plating film is formed on the seed layer 108 exposed to a region without the resist pattern 709 by electroplating.

Figure 7B:
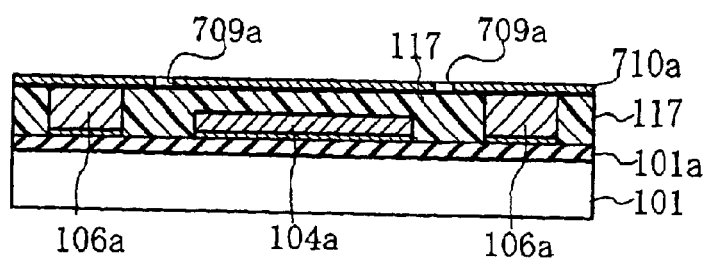

After the resist pattern 709 is removed, the seed layer 108 is selectively etched using the formed metal film 710 as a mask, thereby forming an upper electrode 710a having a plurality of opening portions 709a, as shown in FIG. 7B. As shown in the plan view of FIG. 7D, the opening portions 709a are separated from the formation portion of the support electrode 106a and laid out outside the region above a lower electrode 104a. In this embodiment, the opening portions 709a each with a circular shape having a diameter of 4 μm are separated from the inner edge of the support electrode 106a by 8 μm.

Figure 7C:
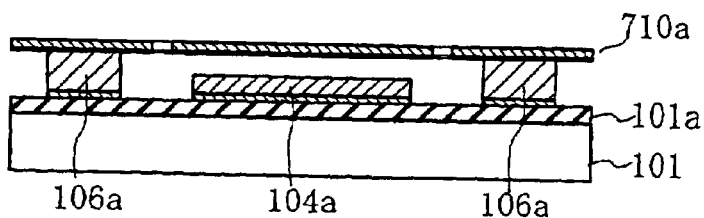
Figure 7D:
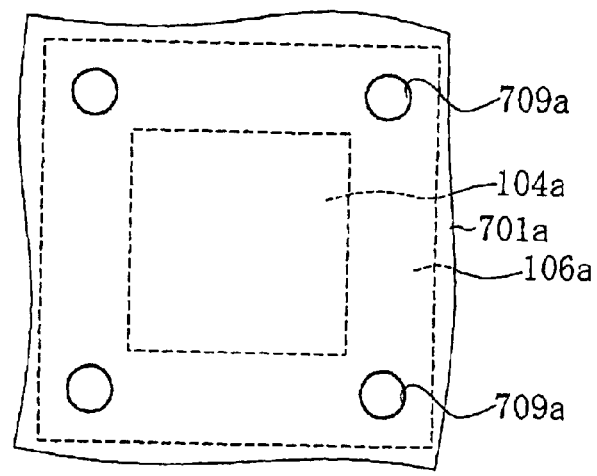

When the sacrificial film 117 is removed through the opening portions of the upper electrode 710a, a space is formed under the upper electrode 710a supported by the support electrode 106a, as shown in FIG. 7C. Hence, a structure in which the upper electrode 710a and lower electrode 104a are separated by the space is formed.

Figure 8A:
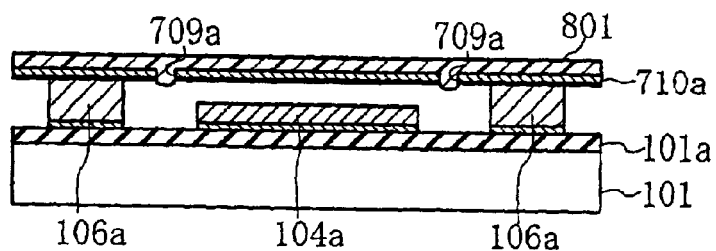
FIGS. 8A to 8D are schematic sectional views showing steps in manufacturing a surface shape recognition sensor according to still another embodiment of the present invention.

As shown in FIG. 8A, an organic polymer resin is spin-coated onto the upper electrode 710a to form a protective film (coat) 801. As the organic polymer resin, a material with poor wettability against the gold plating film is preferably used. For example, polybenzoxazole (or a precursor thereof) is used. An example of a resin based on polybenzoxazole is "CRC8300" available from Sumitomo Bakelite K.K. For example, when the polybenzoxazole resin is spin-coated while rotating a substrate 101 at a rotational speed of 7,000 rpm for 12 sec, a 1-μm thick protective film 801 can be formed. Not an organic polymer resin but another viscous resin may be used.

Figure 8B:
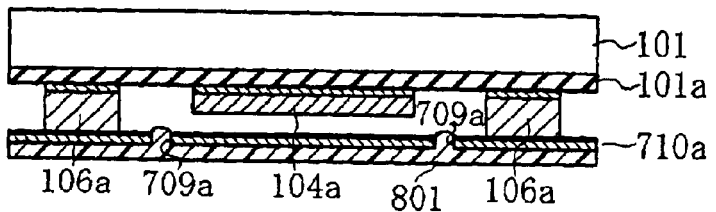

After the protective film 801 is formed in the above way, the surface on which the protective film 801 is formed is immediately set to face downward, as shown in FIG. 8B, and the substrate 101 is heated at 120° C. (10 min). With this heating, the solvent component of the protective film 801 is evaporated to decrease the fluidity of the protective film 801. When the applied protective film 801 is laid out on the lower side, i.e., a gravity acting side, the protective film 801 is prevented from entering the space under the upper electrode 710a from the opening portions 709a of the upper electrode 710a. As a condition at this time, the protective film 801 is laid out on the force (gravity) acting side than the substrate 101 or upper electrode 710a. In other words, no upper electrode 710a is present in the direction of force acting on the applied protective film 801.

As will be described below, when wettability of the material of the applied protective film 801 is poor against the upper electrode 710a, and the surface tension of the applied material reaching the inner wall of each opening portion 709a is larger than the gravity acting on the material reaching the inner wall, the substrate 101 need not be inverted to make the formation surface of the protective film 801 face downward.

Figure 8C:
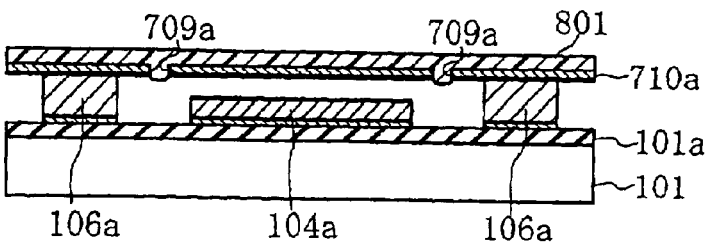

Subsequently, the protective film 801 is annealed at 310° C. for 30 min such that the dissolved substance portion of the organic polymer resin (protective film 801) causes cyclodehydration reactions to thermally cure the protective film 801. With this curing, the protective film 801 loses the fluidity. Hence, a surface shape recognition sensor in which the opening portions 709a are closed by the protective film 801 and the space under the upper electrode 710a is completely sealed is obtained, as shown in FIG. 8C.

Figure 8D:
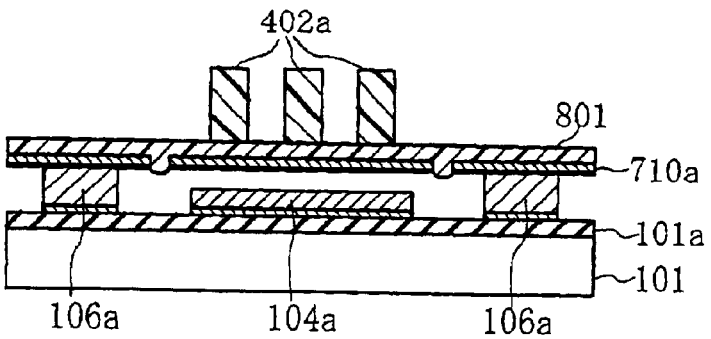

After this, in accordance with the same procedure described with reference to FIGS. 4A to 4C, projections 402a are formed on the protective film 801 formed by coating, as shown in FIG. 8D.

A hollow structure manufacturing method in removing a portion except a sealing film near each opening portion in FIG. 8C will be described with reference to FIGS. 9A to 9D.

Figure 9A:
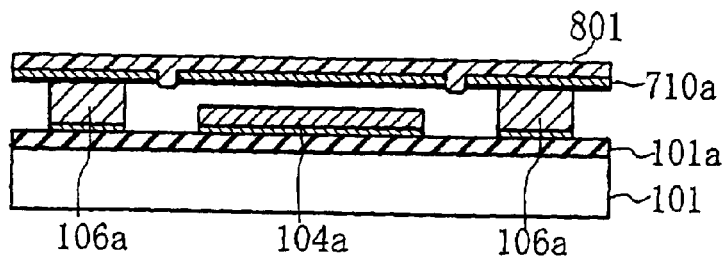
FIGS. 9A to 9D are schematic sectional views showing steps in manufacturing a surface shape recognition sensor according to still another embodiment of the present invention.
Figure 9B:
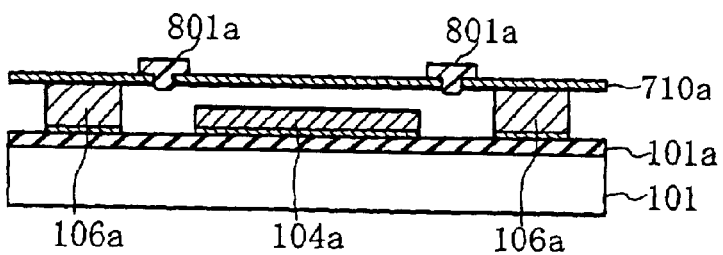

FIG. 9A shows the same state as in FIG. 8A. As described above, the formation surface of the protective film (coat) 801 is set downward, and the substrate 101 is heated to 120° C. (10 min). With this heating, the solvent component of the protective film 801 is evaporated to decrease the fluidity of the protective film 801. Next, portions other than the neighboring portions of the opening portions are exposed by known photolithography. Development is performed to remove the exposed portions while leaving only a protective film 801a near the opening portions, as shown in FIG. 9B.

Figure 9C:
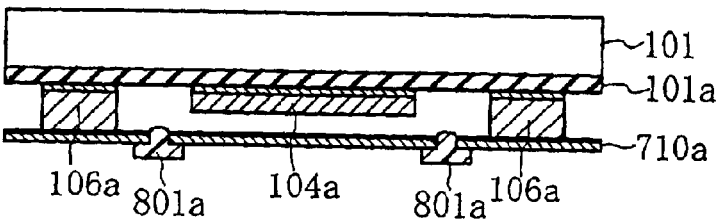
Figure 9D:
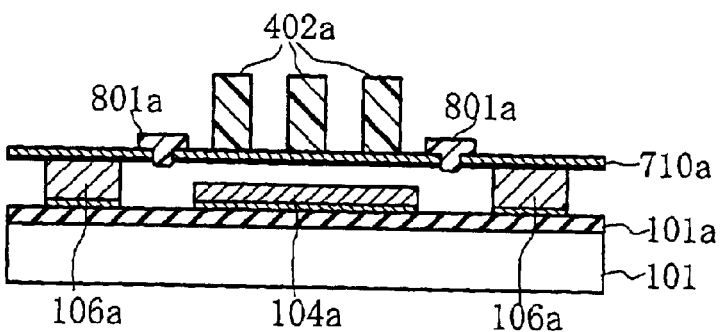

After that, as shown in FIG. 9C, the substrate 101 is inverted such that it vertically faces downward with respect to the gravity, and annealed in a nitrogen gas ambient at 310° C. for 30 min to thermally cure the protective film 801a. When the fluidity of the partially left protective film 801a is almost zero, the substrate 101 need not be inverted at the time of thermal curing. When the projections 402a are formed in accordance with the same procedure as described above, a sealed state with the projections 402a can be obtained, as shown in FIG. 9D.

As described above, according to this embodiment, after the space is formed by removing the sacrificial film at the lower portion using the opening portions of the upper electrode, a sealing film is formed on the upper electrode by coating, thereby easily sealing the space.

According to this embodiment with the above arrangement, the opening portions of the upper electrode, which are prepared to form the space, are laid out in a non-contact state with the support electrode, thereby preventing the applied liquid from entering the space. The applied liquid forms a protective film.

Hence, even in the sealed state, the space formed under the upper electrode can maintain the state before sealing. As a result, according to this embodiment, even when the upper electrode is movably formed, movement of the upper electrode is not impeded after sealing.

Figure 10A:
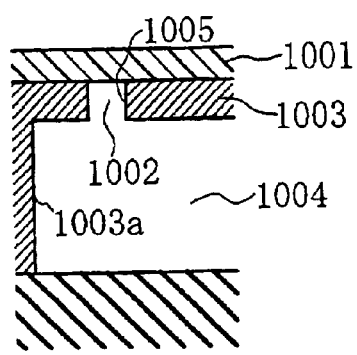
FIGS. 10A to 10F are schematic sectional views for explaining the principle that allows sealing by applying a liquid material in manufacturing the surface shape recognition sensor according to the embodiment of the present invention.

The principle that enables sealing by applying a liquid material as shown in FIGS. 8A and 9A will be described next with reference to FIGS. 10A to 10F. FIG. 10A is a schematic sectional view showing a state wherein a sealing solution 1001 that forms a protective film by spin coating has reached the upper portion of an opening portion 1002 of an upper electrode 1003 to be sealed. The opening portion 1002 is separated from a support electrode 1003a. The sealing solution 1001 on the opening portion 1002 flows into an inner space 1004 under the upper electrode 1003 due to the gravity, as shown in FIG. 10B.

Figure 10B:
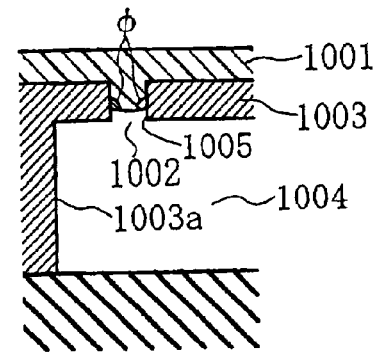
Figure 10C:
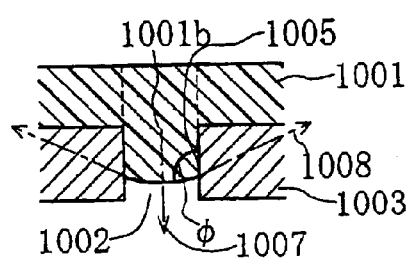

FIG. 10C is an enlarged view of FIG. 10B. When the sealing solution 1001 flows in, let v be the volume of a sealing solution 1001b in the upper region of the opening portion 1002, $\rho$ be the density of the sealing solution 1001, r be the radius of the circular opening portion 1002, $\phi$ be the contact angle between the sealing solution 1001 and an opening portion inner wall 1005, $\gamma$ be the magnitude of the surface tension between the sealing solution 1001 and the material of the opening portion inner wall 1005, and g be the gravitational acceleration. The material of the opening portion inner wall 1005 is the same as that of the upper electrode 1003.

When the contact angle $\phi$ is an acute angle, "the sealing solution wets the opening portion inner wall", and the surface tension acts in a direction to flow the sealing solution 1001 into the inner space. On the other hand, when the contact angle $\phi$ is an obtuse angle, "the sealing solution does not wet the opening portion inner wall", and the surface tension acts in a direction to impede the sealing solution 1001 from flowing into the space. The force that makes the sealing solution 1001 flow into by the gravity is indicated by an arrow 1007. This force is directed vertically downward and has a magnitude $v\rho g$. The surface tension when the contact angle $\phi$ is an obtuse angle is indicated by an arrow 1008.

When the contact angle $\phi$ is an obtuse angle, and the sealing solution 1001 does not wet the opening portion inner wall 1005, the force that acts vertically upward to prevent the sealing solution 1001 from flowing in by the surface tension $\gamma$ is $2\pi r\gamma \cos(\pi-\phi)$.

When $v\rho g > 2\pi r\gamma \cos(\pi-\phi)$, the sealing solution 1001 flows in the space. If $v\rho g \leq 2\pi r\gamma \cos(\pi-\phi)$, inflow of the sealing solution 1001 stops. Hence, when a material which has a large surface tension $\gamma$ and does not wet the opening portion inner wall 1005 is selected, the inflow of the sealing solution 1001 stops before it reaches the inner space 1004 via the opening portion inner wall 1005.

Figure 10D:
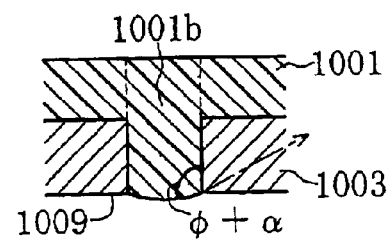
Figure 10E:
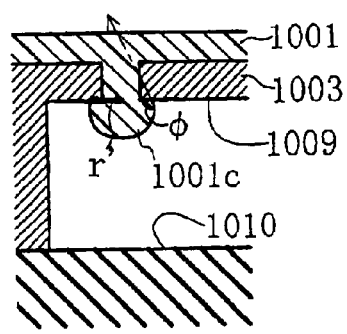
Figure 10F:
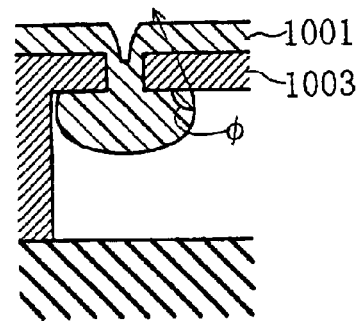

On the other hand, when the surface tension $\gamma$ is small, and the contact angle $\phi$ of the sealing solution 1001 with respect to the opening portion inner wall 1005 is small, the leading end of the sealing solution 1001 reaches an inner space upper surface 1009 and tends to spread along the inner space upper surface 1009, as shown in FIG. 10E.

The contact angle has a constant value determined by the combination of materials. Hence, the direction of surface tension rotates by 90° at maximum when the sealing solution 1001 reaches the inner space upper surface 1009 from the opening portion inner wall 1005. As shown in FIG. 10D, letting $\alpha$ be the rotation angle (change in contact angle) during the process of spreading the sealing solution along the inner space upper surface 1009, the vertical upward force by surface tension is given by $2\pi r\gamma \cos(\pi-(\phi+\alpha))=2\pi r\gamma \cos((\pi-\phi)-\alpha)$.

Since the contact angle $\phi$ is an obtuse angle, $(\pi-\phi)$ indicates an acute angle. When $0 \leq \alpha \leq 90°$ is taken into consideration, the surface tension is completely directed vertically upward during the process and takes a value $2\pi r\gamma$. Hence, when $v\rho g \leq 2\pi r\gamma$, the inflow of the sealing solution 1001 stops before it spreads along the inner space upper surface 1009 even when the sealing solution 1001 stops at the opening portion inner wall 1005, as shown in FIG. 10B. To the contrary, if $v\rho g > 2\pi r\gamma$, the sealing solution 1001 spreads along the inner space upper surface 1009, as shown in FIG. 10E.

Since the surface tension is proportional to the length of the edge where the sealing solution 1001 and inner space upper surface 1009 are in contact with each other, the total surface tension increases as the sealing solution 1001 spreads. Simultaneously, the sealing solution 1001 spreads in a droplet shape and increases its volume. For this reason, the force that spreads a sealing droplet 1001c by the gravity also increases. As shown in FIG. 10E, when the sealing droplet 1001c is approximated to a half-sphere, and its radius is let be r', the surface tension increases in proportion to r'. The gravity that acts on the sealing droplet 1001c increases in proportion to the cube of r'.

Hence, the inflow of the sealing solution 1001 does not stop. The sealing solution 1001 reaches an inner space bottom surface 1010, or the inner space 1004 is filled with the sealing solution 1001. However, when the protective film 1001 on the opening portion 1002 is recessed to decrease the volume, the sealing solution does not always continue flowing.

As described above, when the opening portion 1002 is separated from the support electrode 1003a, the inflow of the sealing solution 1001 stops.

Let ρ be the density of the liquid material, v be the volume of the liquid material for the portion at which the sealing solution has entered the opening portion and a region above that portion when the coat is formed, r be the radius of the opening portion, γ be the surface tension of the liquid material on the opening portion inner wall, and g be the gravitational acceleration. If $v\rho g \leq 2\pi r\gamma$, the inflow of the sealing solution can be suppressed. This applies to a case wherein the opening portion has an almost circular columnar shape.

A case wherein the opening portion has another columnar shape will be described below.

Let t be the thickness of the coat in the region other than the opening portion in forming the coat, a be the sectional area of the opening portion at the boundary between the external portion of the space and the opening portion, b be the peripheral length of the section of the opening portion at the boundary between the space and the opening portion, c be the volume in the opening portion, d be the magnitude of surface tension between the opening portion inner wall and a coat portion that has entered the opening portion, e be the density of the coat, and g be the gravitational acceleration. When $(c+a \times t) \times e \times g \leq b \times d$ is satisfied, the inflow of the sealing solution (a coat portion that has entered the opening portion) can be suppressed.

Figure 11A:
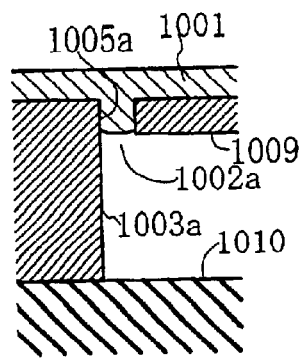
FIGS. 11A to 11C are schematic sectional views for explaining a problem in sealing by applying a liquid material.

A case wherein the opening portion formed to etch the sacrificial film is in contact with the side wall of the inner space will be described next. In this case, an opening portion 1002a is adjacent to the support electrode 1003a, and an opening portion inner wall 1005a partially continues to the support electrode 1003a, as shown in FIG. 11A. FIG. 11A shows a state wherein the sealing solution 1001 is applied and has partially entered the opening portion 1002a.

Figure 11B:
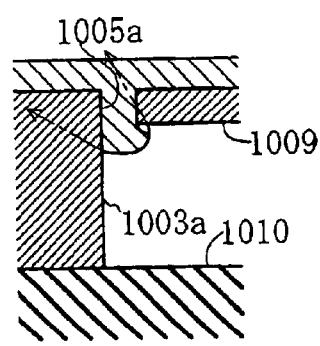

As described above, when the surface tension is larger than the gravity, i.e., when $v\rho g \leq 2\pi r\gamma \cos(\pi-\phi)$, the inflow of the solution stops, as in FIG. 10C. To the contrary, when the surface tension is smaller than the gravity, part of the sealing solution 1001 that has entered the opening portion 1002a reaches the inner space upper surface 1009, as shown in FIG. 11B. In this case, however, the region where the direction of surface tension rotates is smaller as compared to the case shown in FIG. 10D.

Figure 11C:
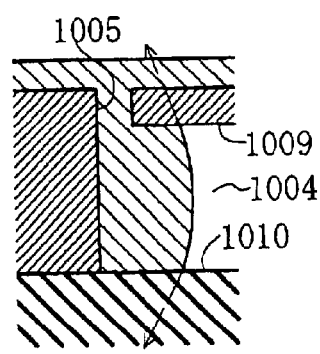

At the portion where the sealing solution 1001 is in contact with the inner space upper surface 1009, the direction of surface tension changes to increase the vertical upward component. However, at the portion where the sealing solution 1001 is in contact with the opening portion inner wall 1005a, the direction of surface tension does not change. Hence, when the opening portion 1002a is adjacent to the support electrode 1003a, as shown in FIG. 11A, the force that impedes the inflow of the sealing solution 1001 is small, and the sealing solution 1001 readily flows into the opening portion. As a consequence, after the sealing solution 1001 has reached the inner space bottom surface 1010 via the inner space side wall 1003, the inner space 1004 is filled with the sealing solution 1001 due to the pressure of the sealing solution 1001, as shown in FIG. 11C.

The relationship between forces at the time of inflow of the sealing solution has been described above. In the actual process, as shown in FIG. 9A, after the sealing solution is applied to form the protective film 801, the substrate 101 is inverted and heated. With this heating, the solvent component of the applied protective film 801 (sealing solution 1001) is evaporated. The viscosity increases, and the protective film is finally hardened (cured). The time until the sealing solution 1001 enters the inner space 1004 via the opening portion inner wall 1005, as shown in FIGS. 10A to 10D, becomes long as the viscosity increases.

This is apparent from the Poiseuille's expression that "the flow rate of a liquid that flows through a capillary in a predetermined time is inversely proportional to the viscosity". In addition, the inflow takes a long time as the thickness of the upper electrode 1003, i.e., the length of the opening portion 1002 becomes large.

When the substrate 101 is inverted at the time of baking, the direction of gravity described with reference to FIGS. 4A to 4C changes to a direction in which the inflow of the sealing solution 1001 to the inner space 1004 is impeded.

As described above, when the opening portion is laid out not to be adjacent to the inner space side wall, the upward component of the surface tension can be increased, and the inflow of the sealing solution can be prevented. When the sealing solution hardly wets the material of the opening portion and the surface tension between them is large, when the radius of the opening portion is small, when the opening portion is long, when a material whose viscosity is high at room temperature and becomes higher upon heating and setting up is used as the sealing solution, or when the time until the substrate is inverted after application of the sealing solution is long, the inner space can be sealed without making the sealing solution flow into the space through the opening portion.

<Sixth Embodiment>

In the surface shape recognition sensor shown in, e.g., FIG. 3C, if the pressure from an object such as a finger to be subjected to surface shape recognition is too large, the upper electrode may be excessively deflected and come into contact with the lower electrode to cause short-circuit. To prevent this, the upper surface of the lower electrode is covered with a dielectric film, as will be described below.

Main part of a method of manufacturing a surface shape recognition sensor according to this embodiment will be described below.

Figure 12A:
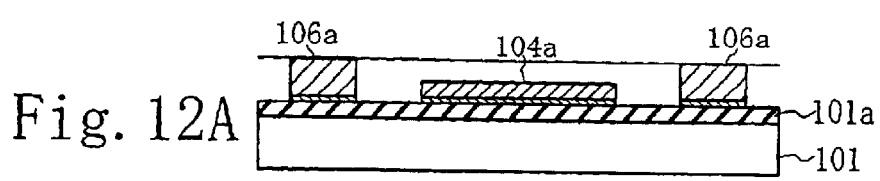
FIGS. 12A to 12E are schematic sectional views showing steps in manufacturing a surface shape recognition sensor according to still another embodiment of the present invention.

First, the same processes as shown in FIGS. 1A to 1D are executed. Then, as shown in FIG. 12A, a lower electrode 104a having a gold upper layer and a support electrode 106a insulated and isolated from the lower electrode 104a are formed on a substrate 101.

Figure 12B:
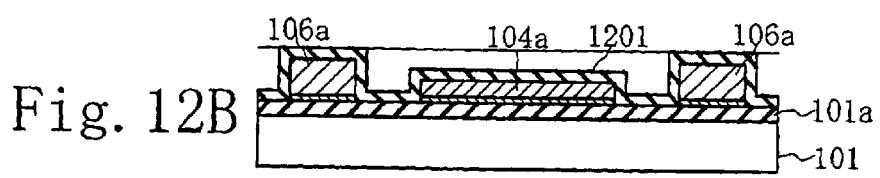

Next, as shown in FIG. 12B, a 0.1-μm thick dielectric film 1201 made of a silicon oxide film is formed by ECR (Electron Cyclotron Resonance) plasma CVD (Chemical Vapor Deposition). The silicon oxide film is formed by using, as source gases, $SiH_4$ and $O_2$ gases and setting the flow rates of the gases to 10 and 20 sccm, respectively, and the microwave power to 200 W. The dielectric film 1201 is not limited to a silicon oxide film. Instead, another insulating material such as a silicon nitride film may be used.

Figure 12C:
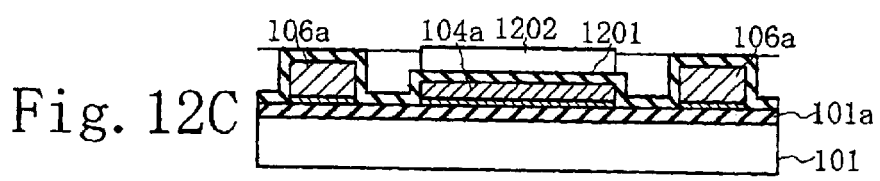
Figure 12D:
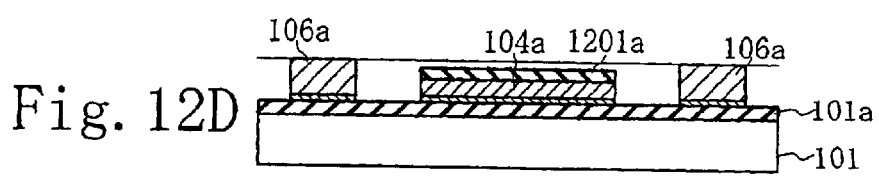

As shown in FIG. 12C, a 1-μm thick resist pattern 1202 is formed in a region on the dielectric film 1201 above the lower electrode 104a to entirely cover the lower electrode 104a. The resist pattern 1202 is formed by known photolithography. After that, the dielectric film 1201 is selectively etched using the resist pattern 1202 as a mask. In this etching, dry etching is performed using $CHF_3$ gas and $O_2$ gas as etching gases. The gas flow rates are set to 30 and 5 sccm, and the microwave power is set to 300 W. As a result, an electrode dielectric film 1201a that covers the lower electrode 104a is formed, as shown in FIG. 12D.

Figure 12E:
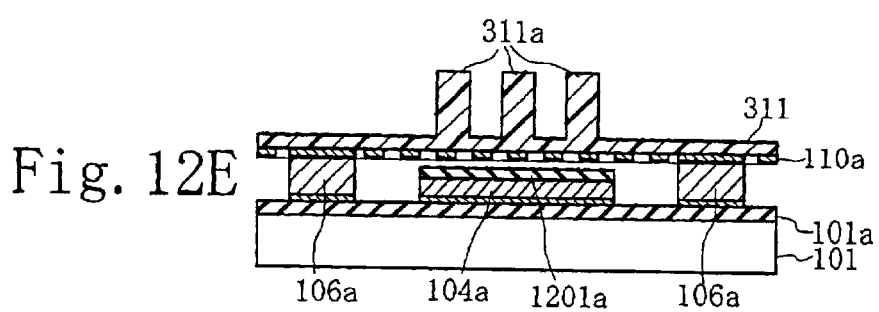

After this, in accordance with the same procedure as shown in FIGS. 1E to 3C, a protective film 311 which has a plurality of projection portions 311a in a region above the lower electrode 104a and covers an upper electrode 110a is formed, as shown in FIG. 12E. According to this surface shape recognition sensor, the electrode dielectric film 1201a is formed on the lower electrode 104a. Hence, even when the upper electrode 110a is largely deflected downward, the lower portion of the upper electrode 110a is prevented from coming into electrical contact with the lower electrode 104a.

To prevent the contact between the lower electrode 104a and the upper electrode 110a, the interval between these electrodes is increased more than necessity. This may decrease the resultant electrostatic capacitance and degrade the sensitivity. However, according to the surface shape recognition sensor shown in FIG. 12E, since the interval between the lower electrode and the upper electrode can be reduced, the sensitivity is not degraded. When the interval is increased, and an excess pressure is applied to the upper electrode 110a in this state, the upper electrode 110a may cause plastic deformation and be unable to return to the original state. However, the surface shape recognition sensor shown in FIG. 12E can also suppress this problem.

Another method of manufacturing the electrode dielectric film will be described next.

First, as in the above-described embodiments, a 5-μm thick resist pattern 103 having an opening portion 103a is formed on a seed layer 102, as shown in FIG. 13A. After the resist pattern 103 is formed, a 1-μm thick metal pattern 104 made of a gold plating film is formed on the seed layer 102 exposed to the opening portion 103a by electroplating.

In this embodiment, after that, a 0.3-μm thick dielectric film 1301 made of a silicon oxide film is formed using ECR plasma CVD without removing the resist pattern 103 (FIG. 13B). In this case as well, the silicon oxide film is formed by using, as source gases, $SiH_4$ and $O_2$ gases and setting the flow rates of the gases to 10 and 20 sccm, respectively, and the microwave power to 200 W.

Next, the resist pattern 103 is removed. At this time, a portion of the dielectric film 1301, which is in contact with the resist pattern 103, is removed by lift-off. Consequently, only a dielectric film 1301a on the metal pattern 104 remains (FIG. 13C). After this, as in FIG. 1C, a resist pattern 105 is formed, and a metal pattern 106 made of a gold plating film is formed by electroplating (FIG. 13D). After that, the resist pattern 105 is removed (FIG. 13E).

The seed layer 102 is selectively etched using the formed metal patterns 104 and 106 as a mask. In this etching, first, the upper layer of the seed layer 102, i.e., the gold film is selectively removed using an etchant containing iodine, ammonium iodide, water, and ethanol. Next, the lower layer of the seed layer 102, i.e., the titanium film is selectively removed using an HF-based etchant. At this time, the dielectric film 1301a is also etched by the HF-based etchant. However, since the thickness of the dielectric film 1301a is 0.3 μm, the dielectric film 1301a is not entirely removed while the 0.1-μm thick titanium film is completely etched. The dielectric film 1301a remains as an electrode dielectric film 1301b (to be described below).

As a result, as shown in FIG. 13F, the lower electrode 104a having a gold upper layer, the electrode dielectric film 1301b on the lower electrode 104a, and the support electrode 106a insulated and isolated from the lower electrode 104a and electrode dielectric film 1301b are formed on the substrate 101.

FIG. 13F corresponds to the state shown in FIG. 12D. Then, in accordance with the same procedure as in FIGS. 1E to 3C, the surface shape recognition sensor shown in FIG. 12E is formed.

In this embodiment, a silicon oxide film is used as the dielectric film 1301. However, any other insulating material such as a silicon nitride film may be used as long as it is not etched in etching the gold, titanium, and sacrificial films or it is etched only in a small amount.

The electrode dielectric film may be formed in the following way.

Figure 14A:
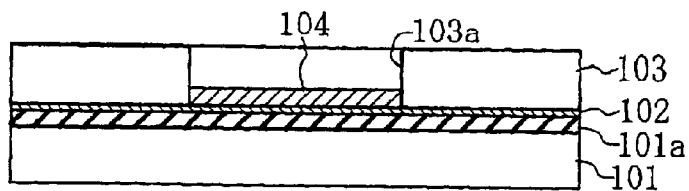
FIGS. 14A to 14G are schematic sectional views showing steps in manufacturing a surface shape recognition sensor according to still another embodiment of the present invention.
Figure 14B:
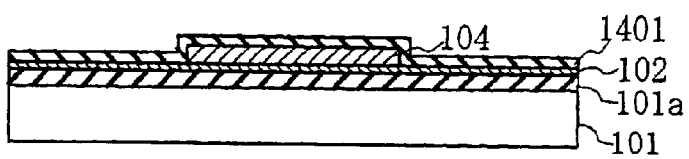

As in the above-described embodiments, the 5-μm thick resist pattern 103 having the opening portion 103a is formed on the seed layer 102, as shown in FIG. 14A. After the resist pattern 103 is formed, the 1-μm thick metal pattern 104 made of a gold plating film is formed on the seed layer 102 exposed to the opening portion 103a by electroplating.

In this embodiment, next, the resist pattern 103 is removed. Then, a 0.1-μm thick dielectric film 1401 made of a silicon oxide film is formed on the seed layer 102 to cover the metal pattern 104. The dielectric film 1401 is formed in accordance with the same procedure as that for the dielectric film 1201 shown in FIG. 12B.

Figure 14C:
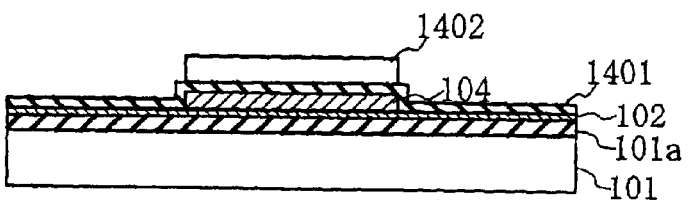
Figure 14D:
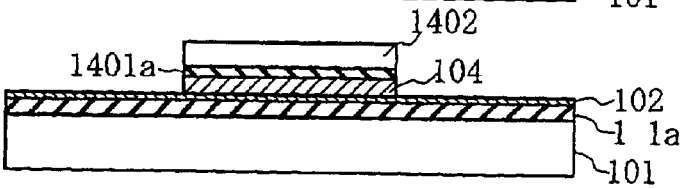
Figure 14E:
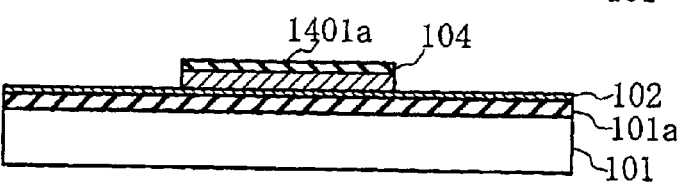

As shown in FIG. 14C, a 1.0-μm thick resist pattern 1402 is formed on the metal pattern 104 in a region on the dielectric film 1401 by known photolithography. After the resist pattern 1402 is formed, the dielectric film 1401 is selectively etched and removed using the resist pattern 1402 as a mask (FIG. 14D). In this dry etching, $CHF_3$ gas and $O_2$ gas are used as etching gases, the gas flow rates are set to 30 and 5 sccm, respectively, and the microwave power is set to 300 W. Next, the resist pattern 1402 is removed, thereby forming an electrode dielectric film 1401a formed from a silicon oxide film on the metal pattern 104, as shown in FIG. 14E.

Figure 14F:
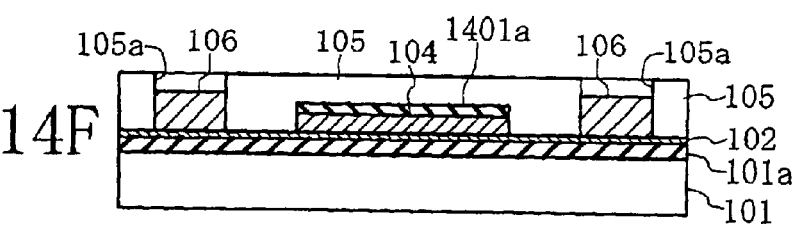
Figure 14G:
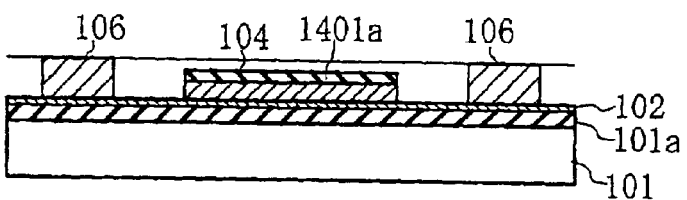

After that, as in FIG. 1C, a resist pattern is formed, and the metal pattern 106 made of a gold plating film is formed by electroplating (FIG. 14F). The resist pattern is removed (FIG. 14G). FIG. 14G corresponds to the state shown in FIG. 12D. Then, in accordance with the same procedure as in FIGS. 1E to 3C, the surface shape recognition sensor shown in FIG. 12E is formed. The dielectric film 1401 may also be formed from any other insulating material such as a silicon nitride film as long as it is not etched in etching the gold, titanium, and sacrificial films or it is etched only in a small amount.

The operation of the surface shape recognition sensor whose manufacturing process has been described in the above embodiments will be described next.

Figure 15A:
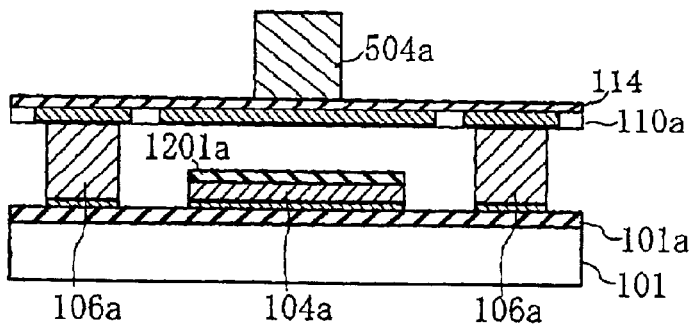
FIGS. 15A and 15B are schematic sectional views showing the operative states of the surface shape recognition sensor.
Figure 15B:
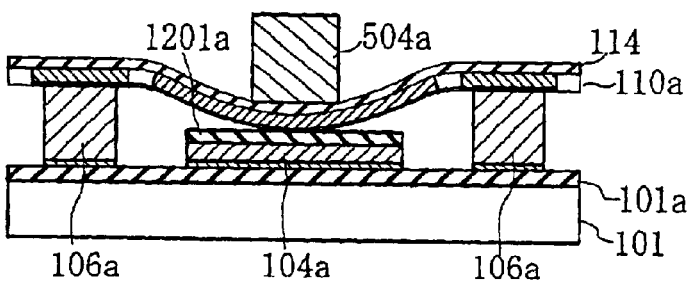

FIGS. 15A and 15B show the operation principle of the surface shape recognition sensor. An object such as a finger to be subjected to surface shape recognition is pressed against sensor chips that are two-dimensionally arrayed on the surface shape recognition sensor. At this time, a recess of the object having a three-dimensional pattern does not come into contact with the surface shape recognition sensor (FIG. 15A). On the other hand, a projection of the object comes into contact with the upper portion of the surface shape recognition sensor to apply a pressure to a projection 504a (FIG. 15B). The upper electrode 110a is deflected in accordance with the magnitude of the pressure. A surface shape recognition sensor having the projection 504a made of a metal will be exemplified here.

When the upper electrode 110a is deflected, the electrostatic capacitance formed between the upper electrode 110a and the lower electrode 104a increases. The increase amount of the electrostatic capacitance is detected by an integrated circuit (not shown) on the substrate 101. In addition, the change amount of the electrostatic capacitance is converted into halftone data to detect the surface shape.

In this operation, if a large external force is applied, the upper electrode 110a is deflected toward the lower electrode 104a. According to this embodiment, since the electrode dielectric film 1201a is formed, the upper electrode 110a can be prevented from coming into contact with the lower electrode 104a.

Hence, any short-circuit between the upper electrode 110a and the lower electrode 104a due to contact can be avoided. Additionally, the metal surfaces of the upper electrode 110a and lower electrode 104a are prevented from coming into tight contact with each other.

Furthermore, since the electrode dielectric film 1201a is made of a dielectric material, the change amount of the electrostatic capacitance formed between the upper electrode 110a and the lower electrode 104a can be increased. When the electrode dielectric film 1201a is set to an appropriate thickness, and an upper limit is given to the deformable depth of the upper electrode 110a, any mechanical fatigue and destruction of the upper electrode 110a due to deformation can be prevented.

Figure 16A:
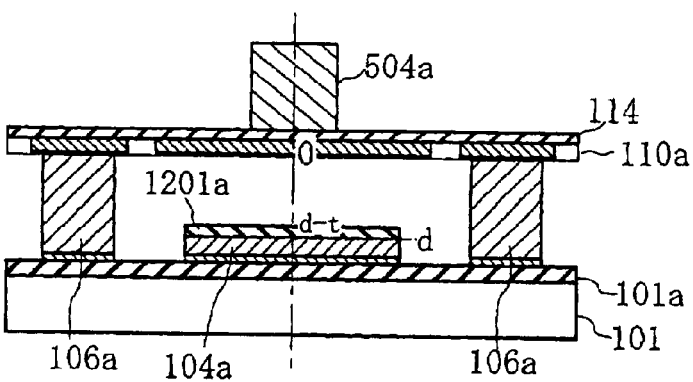
FIGS. 16A and 16B are schematic sectional views showing the operative states of the surface shape recognition sensor.
Figure 16B:
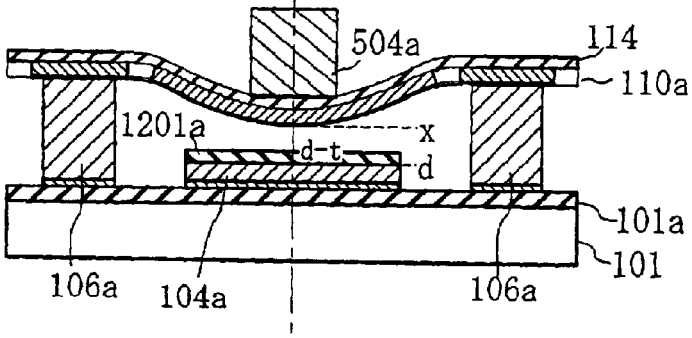

An electrode dielectric film design method for realizing the above advantages will be described next. For the simplicity, as shown in FIG. 16A, an axis is set while defining the direction in which the upper electrode 110a is deflected as a positive direction and an origin at the center of the upper electrode 110a when no pressure is applied. Let t be the thickness of the electrode dielectric film 1201a, and (d−t) be the interval between the upper electrode 110a and the electrode dielectric film 1201a. In addition, let x be the position at which the upper electrode 110a is deflected by an external pressure, as shown in FIG. 16B.

Figures 17A, 17B, 17C:
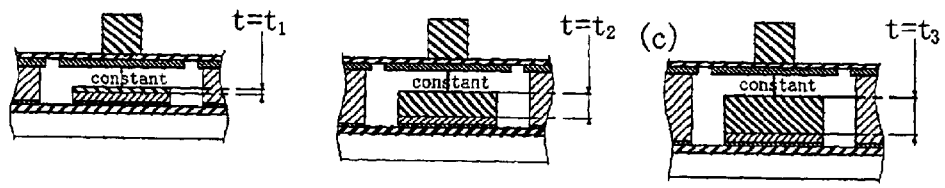
FIGS. 17A to 17C are schematic sectional views for explaining the operative states of a surface shape recognition sensor according to still another embodiment of the present invention.
Figure 17D:
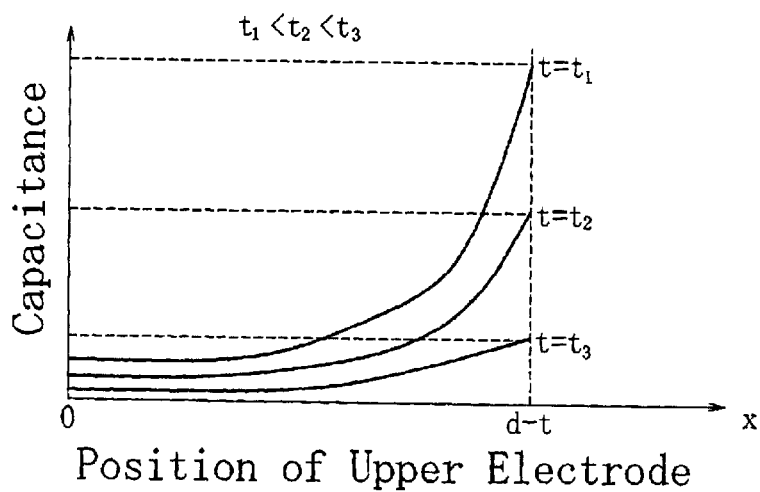
FIG. 17D is a graph showing the characteristic of the surface shape recognition sensor according to the embodiment of the present invention.

First, a case wherein the deformable depth (d−t) of the upper electrode 110a is set constant, and the thickness of the electrode dielectric film 1201a is changed, as shown in FIGS. 17A, 17B, and 17C, will be examined. FIG. 17D shows a change in electrostatic capacitance in this state when the upper electrode 110a is moved from a position x=0 to a position x=d−t. As is apparent from FIG. 17D, the thinner the electrode dielectric film 1201a becomes, the wider the dynamic range of the electrostatic capacitance becomes.

Figure 18A:
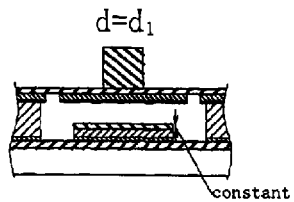
FIGS. 18A to 18C are schematic sectional views for explaining the operative states of a surface shape recognition sensor according to still another embodiment of the present invention.
Figure 18B:
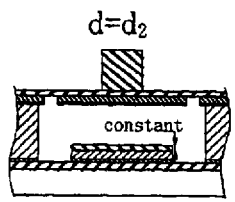
Figure 18C:
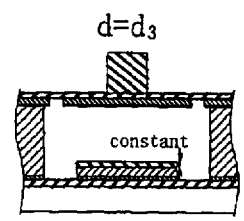
Figure 18D:
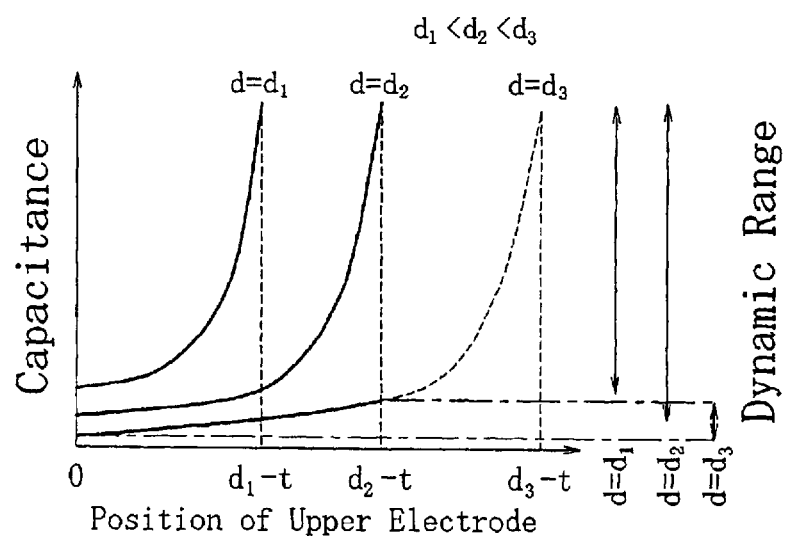
FIG. 18D is a graph showing the characteristic of the surface shape recognition sensor according to the embodiment of the present invention.

Next, a case wherein the thickness of the electrode dielectric film 1201a is set constant, and the deformable depth of the upper electrode 110a is changed ($d_1-t<d_2-t<d_3-t$), as shown in FIGS. 18A, 18B, and 18C, will be examined. FIG. 18D shows a change in electrostatic capacitance in this state when the upper electrode 110a is moved from x=0 to a possible value.

To make the device function as a sensor, the upper electrode must deform when a pressure is applied and return to the original state before deformation when no pressure is applied. The upper electrode has a certain threshold value. When the deformation amount has that value or less, elastic deformation occurs so that the upper electrode can return to the original state. However, when the deformation amount exceeds that value, plastic deformation occurs, and the upper electrode cannot return to the original state.

Referring to FIG. 18D, the moving amount of the upper electrode, which serves as the threshold value between elastic deformation and plastic deformation, is represented by $d_2-t$. When $0 \leq x \leq d_2-t$, elastic deformation occurs. When $d_2-t \leq x$, plastic deformation occurs. Hence, even when $d=d_3$, i.e., the distance between the upper electrode 110a and the electrode dielectric film 1201a is large, the deformable range of the sensor is $0 \leq x \leq d_2-t$. For this reason, the dynamic range of the electrostatic capacitance is maximized when $d=d_2$, as is apparent from FIG. 18D. That is, the dynamic range is maximized when the upper electrode can deform at maximum within the range of elastic deformation.

A case wherein the thickness of the electrode dielectric film 1201a and the deformable depth of the upper electrode 110a are set constant, and a dielectric constant $\epsilon$ of the electrode dielectric film is changed will be examined. When electrode dielectric films having different permittivities $\epsilon_3 < \epsilon_2 < \epsilon_1$ are used, as shown in FIGS. 19A, 19B, and 19C, the electrostatic capacitances have dynamic ranges corresponding to the permittivities, as shown in FIG. 19D. That is, the higher the dielectric constant of the electrode dielectric film becomes, the wider the dynamic range of the electrostatic capacitance in the sensor becomes.

Figure 20A:
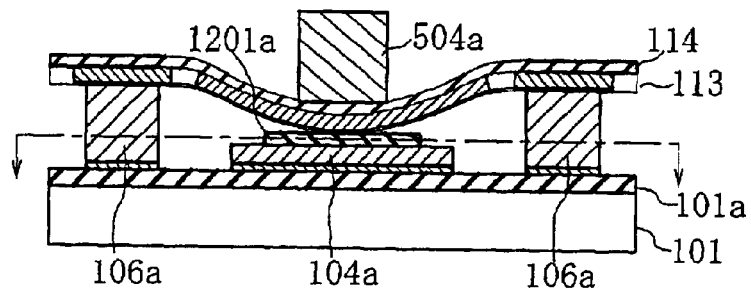
FIG. 20A is a schematic sectional view for explaining an operative state of a surface shape recognition sensor according to still another embodiment of the present invention.
Figure 20B:
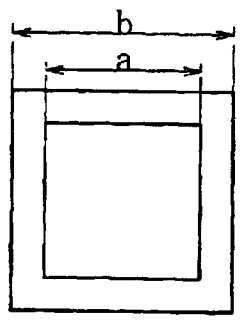
FIG. 20B is a partial plan view of the surface shape recognition sensor according to the embodiment of the present invention.

The shape of the electrode dielectric film 1201a will be described next. Both the lower electrode 104a and electrode dielectric film 1201a are formed into square shapes, and an axis is set by defining the centers of the squares as an origin, as shown in FIG. 20A. FIG. 20B shows the lower electrode 104a and electrode dielectric film 1201a in FIG. 20A, which are viewed from the upper side. The lower electrode 104a has a square shape having sides b, and the electrode dielectric film 1201a has a square shape having sides a.

Figure 20C:
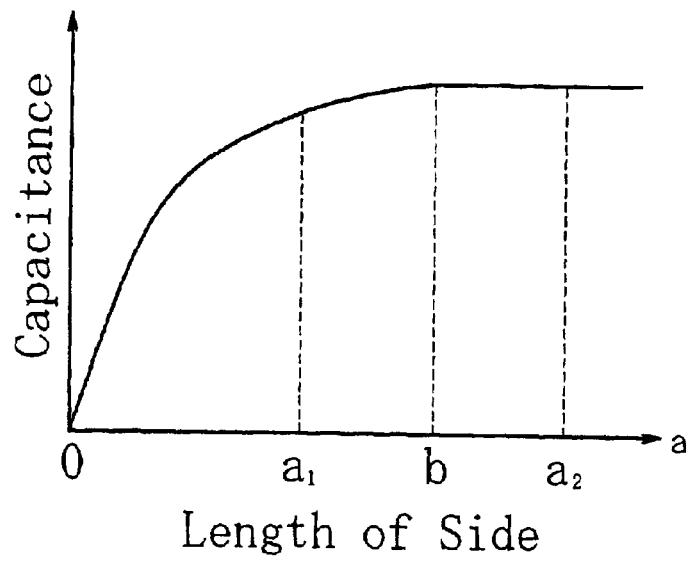
FIG. 20C is a graph showing the characteristic of the surface shape recognition sensor according to the embodiment of the present invention.
Figure 21:
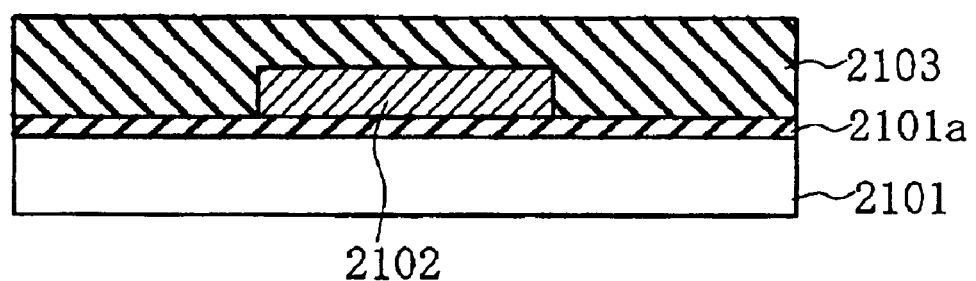
FIG. 21 is a schematic sectional view showing the structure of a conventional surface shape recognition sensor.
Figure 22:
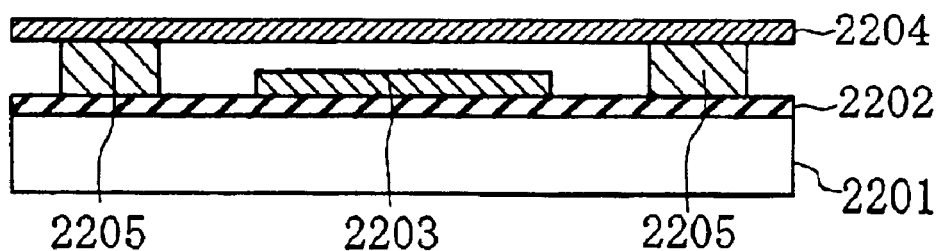
FIG. 22 is a schematic sectional view showing the structure of a surface shape recognition sensor having a deformable upper electrode.

FIG. 20C shows the electrostatic capacitance formed between the lower electrode 104a and the upper electrode 110a in this structure when a is increased from 0. The electrostatic capacitance when $0 \leq a \leq b$ and $a=a_1$ is smaller than that when $a=b$. The electrostatic capacitance when $a>b$ and $a=a_2$ equals that when $a=b$. In a region where $a>b$, the electrostatic capacitance between the lower electrode 104a and support electrode 106a undesirably increases.

For the above reasons, the electrode dielectric film 1201a is formed to appropriately cover the lower electrode 104a. In the actual process, since it is difficult to form the electrode dielectric film and lower electrode into completely congruent shapes, a margin of about 1 μm is taken into consideration. In FIGS. 20A, 20B, and 20C, the lower electrode 104a is assumed to have a square shape. However, the above facts can apply even to a structure having another shape.

The above description will be summarized. To amplify and detect the difference between the external recess and projection at a high sensitivity, the dynamic range of the electrostatic capacitance is preferably wide. For this purpose, the electrode dielectric film 1201a is formed as thin as possible. The electrode dielectric film is formed into a shape congruent with the lower electrode 104a. The surface of the electrode dielectric film 1201a is formed at a position at which the upper electrode 110a does not exceed the limit of elastic deformation.

As has been described above, according to the present invention, since a plurality of projections are formed on an upper electrode via a protective film, the sensitivity can be improved. In addition, since a deformable upper electrode is formed above a lower electrode while separated from the lower electrode, the device does not cause electrostatic destruction due to static electricity generated at the time of sensing. As described above, the surface shape recognition sensor of the present invention is compact and has excellent stability and high sensitivity and versatility.

What is claimed is:

1. A surface shape recognition sensor comprising:
a plurality of capacitive detection elements formed from lower electrodes and a deformable plate-like upper electrode made of a metal, the lower electrodes being insulated and isolated from each other and stationarily laid out on a single plane of an interlevel dielectric formed on a semiconductor substrate, and the upper electrode being laid out above the lower electrodes at a predetermined interval and having a plurality of opening portions;
a support electrode laid out around the lower electrodes while being insulated and isolated from the lower electrodes, and formed to be higher than the lower electrodes to support the upper electrode;
a protective film formed on the upper electrode to close the opening portions; and
a plurality of projections per one pixel laid out in a region of said protective film above said capacitive detection element.

2. A sensor according to claim 1, wherein said sensor comprises an electrode dielectric film laid out on the lower electrode, and the upper electrode is laid out above said electrode dielectric film at a predetermined interval.

3. A sensor according to claim 2, wherein letting A be a moving amount of a central portion of the upper electrode when the upper electrode deforms at maximum within an elastic deformation range, the interval between the upper electrode and said electrode dielectric film is not more than A.

4. A sensor according to claim 2, wherein said electrode dielectric film is formed into substantially the same shape as that of the lower electrode and laid out to cover the lower electrode.

5. A sensor according to claim 1, further including a projection made of a metal.

6. A sensor according to claim 5, wherein said projection is laid out in a region above the lower electrode.

7. A sensor according to claim 6, wherein a plurality of projections are laid out in the region above said capacitive detection element.

8. A sensor according to claim 5, wherein said sensor comprises an electrode dielectric film laid out on the lower electrode, and the upper electrode is laid out above said electrode dielectric film at a predetermined interval.

9. A sensor according to claim 8, wherein letting A be a moving amount of a central portion of the upper electrode when the upper electrode deforms at maximum within an elastic deformation range, the interval between the upper electrode and said electrode dielectric film is not more than A.

10. A sensor according to claim 8, wherein said electrode dielectric film is formed into substantially the same shape as that of the lower electrode and laid out to cover the lower electrode.

* * * * *

UNITED STATES PATENT AND TRADEMARK OFFICE
CERTIFICATE OF CORRECTION

| | | |
|---|---|---|
| PATENT NO. | : 7,123,026 B2 | Page 1 of 1 |
| APPLICATION NO. | : 10/052640 | |
| DATED | : October 17, 2006 | |
| INVENTOR(S) | : Sato et al. | |

It is certified that error appears in the above-identified patent and that said Letters Patent is hereby corrected as shown below:

Title Page
In Item [56], under Foreign Patent Documents, line 1, please delete "11-248 10" and insert -- 11-248410 --.

In Claim #7, line 1, please delete "6" and insert -- 5 --.

Signed and Sealed this

First Day of July, 2008

JON W. DUDAS
*Director of the United States Patent and Trademark Office*